United States Patent
Suzue et al.

(10) Patent No.: US 9,880,791 B2
(45) Date of Patent: Jan. 30, 2018

(54) IMAGE FORMATION APPARATUS AND NON-TRANSITORY COMPUTER-READABLE STORAGE MEDIUM HAVING STORED THEREON A PROGRAM EXECUTABLE ON IMAGE FORMATION APPARATUS

(71) Applicant: Konica Minolta, Inc., Chiyoda-ku, Tokyo (JP)

(72) Inventors: Tadashi Suzue, Hachioji (JP); Shigeyuki Ueda, Kodaira (JP); Masao Hosono, Itami (JP); Satoshi Osako, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/375,470

(22) Filed: Dec. 12, 2016

(65) Prior Publication Data
US 2017/0168758 A1    Jun. 15, 2017

(30) Foreign Application Priority Data
Dec. 14, 2015 (JP) .................... 2015-243357

(51) Int. Cl.
G06F 3/12 (2006.01)
G06F 9/50 (2006.01)
G06K 15/02 (2006.01)

(52) U.S. Cl.
CPC ............ G06F 3/122 (2013.01); G06F 3/123 (2013.01); G06F 3/1263 (2013.01); G06F 9/50 (2013.01);
(Continued)

(58) Field of Classification Search
None
See application file for complete search history.

(56) References Cited

U.S. PATENT DOCUMENTS

2001/0018717 A1    8/2001  Shimotono
2009/0007105 A1*   1/2009  Fries .................... G06F 8/65
                                                     718/1
(Continued)

FOREIGN PATENT DOCUMENTS

JP    2001256066 A    9/2001
JP    2014157476 A    8/2014
JP    2014-238665 A   12/2014

OTHER PUBLICATIONS

Allyson Brito et al., "IBM PowerVM Virtualization Active Memory Sharing", Second Edition, IBM International Technical Support Organization, Jun. 2011. (122 pages).

*Primary Examiner* — Fan Zhang
(74) *Attorney, Agent, or Firm* — Buchanan Ingersoll & Rooney PC

(57) ABSTRACT

An image formation apparatus includes a hypervisor, a control firmware running on a host OS and responsible for controlling the image formation apparatus, and a cooperation module operating on the same level as the hypervisor. A resource includes an image memory managed by the control firmware and adapted for image processing. The cooperation module is configured to: cooperate with the control firmware to obtain an available memory space of the image memory; associate a content of a job to be processed with a program running on one or more guest OSs required for that job; and before starting the job, read a required guest OS into the available memory space of the image memory and cause the associated program to be executed.

16 Claims, 12 Drawing Sheets

(52) U.S. Cl.
CPC ..... *G06K 15/1806* (2013.01); *G06K 15/1817* (2013.01)

(56) References Cited

U.S. PATENT DOCUMENTS

| | | | | |
|---|---|---|---|---|
| 2009/0178033 | A1* | 7/2009 | Challener | G06F 9/4411 717/168 |
| 2011/0276742 | A1* | 11/2011 | Anand | G06F 11/3433 711/102 |
| 2012/0059930 | A1* | 3/2012 | Devarakonda | H04L 43/0817 709/224 |
| 2012/0307294 | A1* | 12/2012 | Matsuda | G06F 3/1219 358/1.15 |
| 2014/0139869 | A1* | 5/2014 | Honma | H04N 1/00347 358/1.15 |
| 2014/0229686 | A1* | 8/2014 | Tsirkin | G06F 9/45533 711/147 |
| 2014/0331017 | A1* | 11/2014 | Dawson | G06F 9/45558 711/162 |
| 2015/0269031 | A1* | 9/2015 | Wang | G06F 9/45558 718/1 |
| 2015/0371042 | A1* | 12/2015 | Mooring | G06F 9/45545 726/1 |
| 2016/0344745 | A1* | 11/2016 | Johnson | H04L 67/34 |
| 2017/0180427 | A1* | 6/2017 | Kashyap | H04L 63/205 |

\* cited by examiner

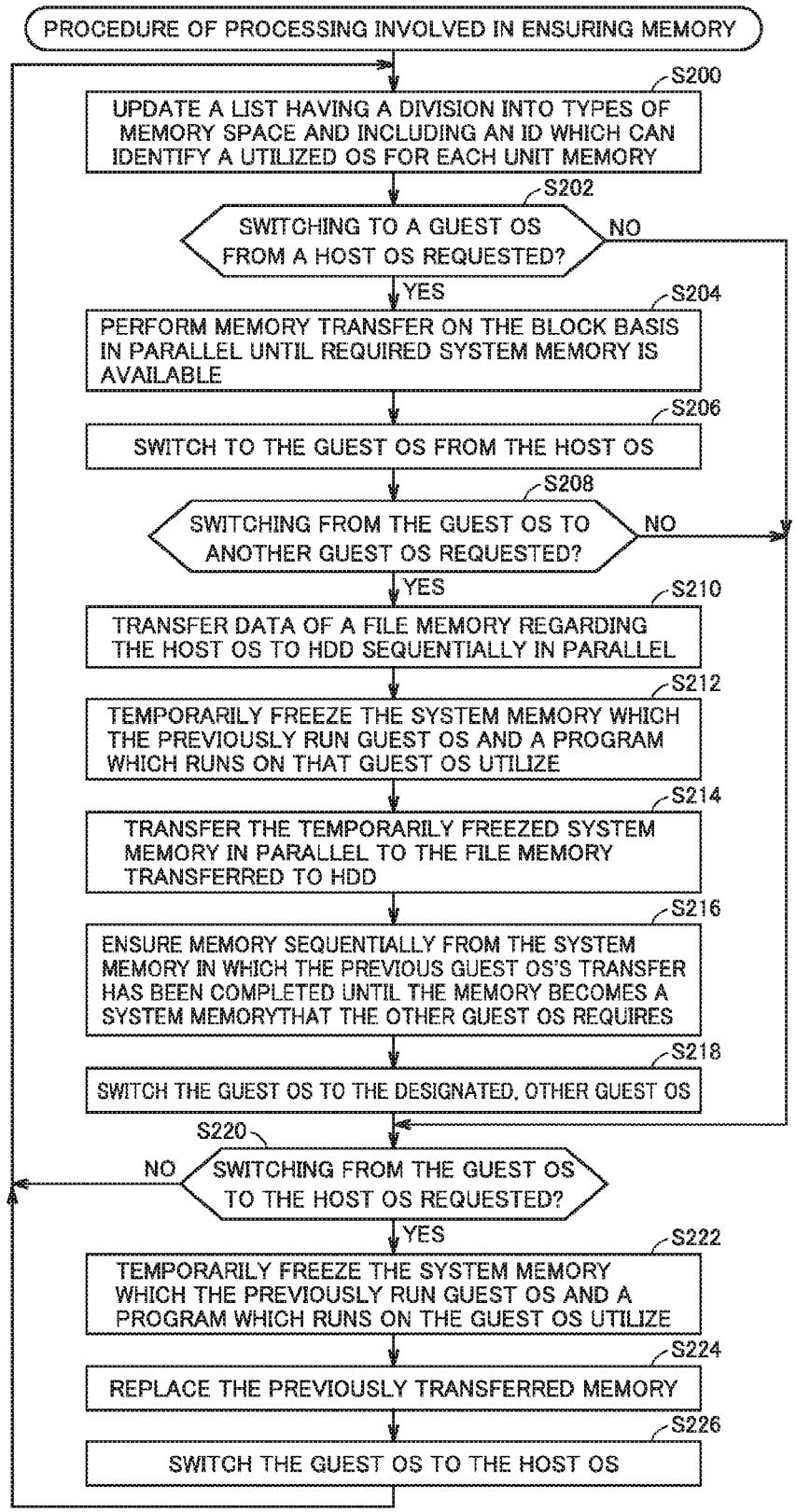

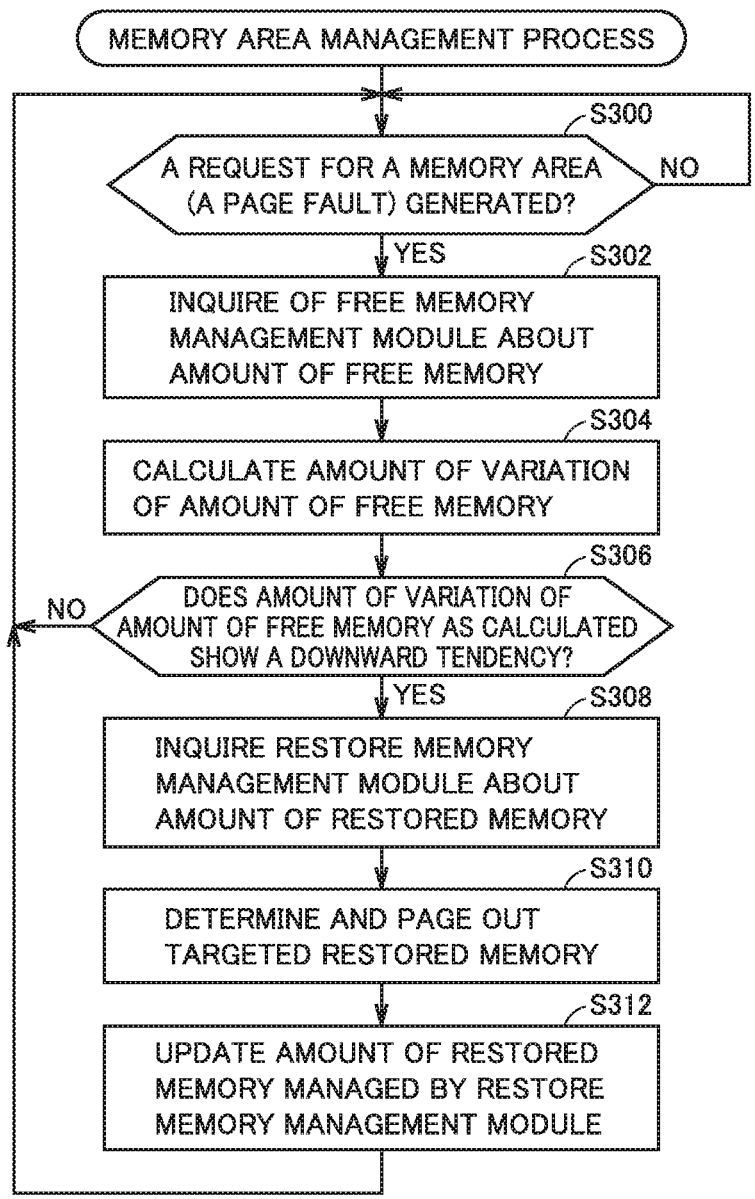

IMAGE FORMATION APPARATUS AND NON-TRANSITORY COMPUTER-READABLE STORAGE MEDIUM HAVING STORED THEREON A PROGRAM EXECUTABLE ON IMAGE FORMATION APPARATUS

This application is based on Japanese Patent Application No. 2015-243357 filed with the Japan Patent Office on Dec. 14, 2015, the entire content of which is hereby incorporated by reference.

BACKGROUND OF THE INVENTION

Field of the Invention

The present disclosure relates to an image formation apparatus capable of switching and thus running a plurality of OSs and a non-transitory computer-readable storage medium having stored thereon a program executable on such an image formation apparatus.

Description of the Related Art

Computer virtualization technology is being applied to various fields as information communication technology progresses in recent years. In such virtualization technology, for example a hypervisor can be utilized so that in addition to a main OS (Operating System) (hereafter also referred to as a "host OS"), one or more different OSs (hereafter also referred to as a "guest OS") can be running on common hardware simultaneously.

For example Japanese Laid-Open Patent Publication No. 2001-256066 discloses an environment in which a plurality of operating systems allowed to co-exist in a single system can be rapidly switched and thus used.

Furthermore, "IBM PowerVM Virtualization Active Memory Sharing", Second Edition (June 2011), IBM International Technical Support Organization, June 2011 discloses a system in which a plurality of logic memory partitions (LPAR: Logical PARtitions) are collected as a single common physical memory space and shared and thus used between multi-OSs as what is assigned logic memory partition.

Generally, when in addition to a host OS one or more guest OSs are running simultaneously, then, in proportion to the number of OSs (guest OSs in particular) running, a larger memory space is required. Accordingly, many virtualization technologies are equipped with a scheme which permits overcommitment when an upper limit of a system memory prepared in hardware is exceeded as a guest OS is running. For example Japanese Laid-Open Patent Publication No. 2014-157476 disclose a configuration which senses that a physical resource shared between virtual machines runs out.

A specific example of the scheme which permits overcommitment includes a processing in which a memory area utilized as a memory space is ensured in a secondary storage device such as a hard disk and a content stored in a system memory is temporarily restored to the ensured memory area.

However, a secondary storage device such as a hard disk is inferior in responsiveness to a system memory such as dynamic random access memory (DRAM), and accordingly, requires a long period of time to switch to a guest OS from a host OS for example. Such an issue is difficult to resolve when a limited resource is used. If a sufficiently large resource is prepared, a possibility that such an issue will arise can be reduced.

An image formation apparatus is also unable to allow available resource to be so large due to a constraint on cost. In particular, it is general to adopt hardware having a merit in terms of cost, rather than hardware having a high processing performance such as state-of-the-art computing environments. Under such a constraint on cost, an image formation apparatus has a memory configuration designed so that processing a job can be more prioritized.

For example, Japanese Laid-Open Patent Publication No. 2014-238665 discloses an image formation apparatus in which a first OS in which by using a hardware resource a processing involved in image formation is done by device control firmware and a second OS distinguished from and located on the first OS are each configured to be operable. When a predetermined specific state is sensed as the processing is done in the device control firmware, the device control firmware performs control to start the second OS and also performs control to perform a login process for the second OS. In this image formation apparatus, a first OS user name is used as a second OS user name to simplify a login procedure to allow a second OS login procedure to be performed fast.

In the image formation apparatus disclosed in Japanese Laid-Open Patent Publication No. 2014-238665, when a job such as image processing is generated, and a resource such as memory runs short, it is necessary to deliver over a resource to the first OS of body control, and accordingly, a logout process for the second OS's resource-releasing will be required. The period of time required for this logout process may delay starting execution of image processing.

In a conventional image formation apparatus, a form of using a memory to co-establish prioritizing job-processing and rapidly switching and thus running a plurality of OSs is not considered. Accordingly, for example, when a job which requires authentication is executed on an application on a guest OS, and a system memory runs out of resource, a period of time required for a processing to restore a content of the system memory arises, and a delay is caused when switching from a host OS to the guest OS and running the guest OS. As a result, an issue arises such as degradation of usability for processing the job, and reduction in productivity.

In an image formation apparatus, an operation utilizing a function of a guest OS which does not affect processing a job is permissible, however, when a guest OS function in liaison with processing the job is utilized, rapid switching to the guest OS from the host OS is required.

The present inventors have found a new issue, i.e., rapidly switching and thus running a plurality of OSs while prioritizing processing a job. However, such a new issue cannot be solved by simply applying a conventional hypervisor etc. to an image formation apparatus.

Accordingly, there is a demand for a novel configuration in an image formation apparatus for running a plurality of OSs simultaneously while prioritizing processing a job.

SUMMARY OF INVENTION

An image formation apparatus according to an embodiment includes: a hypervisor for using a resource including a processor and a system memory to control simultaneously running a plurality of OSs including a host OS and at least one guest OS, a control firmware running on the host OS and responsible for controlling the image formation apparatus; a cooperation module operating on a same level as the hypervisor; and a free memory management module for managing a free memory space of the system memory that is not used by the host OS or a guest OS running simultaneously with the host OS. The resource includes an image memory managed by the control firmware and adapted for image processing. The cooperation module includes: means for cooperating with the control firmware to obtain an available memory space of the image memory; means for associating a content of a job to be processed with a program running on one or more guest OSs required for that job; means for reading a required guest OS into the available memory space of the image memory before starting the job, and causing the associated program to be executed; and means for restoring a content of the system memory determined as not being used by the host OS and another guest OS to the image memory to allow the system memory to be used as a system memory for a newly run guest OS.

According to an embodiment, a non-transitory computer-readable storage medium having stored thereon a program executable on an image formation apparatus is provided. The program includes: instructions for using a resource including a processor and a system memory to implement a hypervisor to control simultaneously running a plurality of OSs including a host OS and at least one guest OS; a control firmware running on the host OS and responsible for controlling the image formation apparatus; instructions for implementing a cooperation module operating on a same level as the hypervisor; and instructions for implementing a free memory management module that manages a free memory space of the system memory which is not used by the host OS or a guest OS running simultaneously with the host OS. The resource includes an image memory managed by the control firmware and adapted for image processing. The cooperation module includes: a functionality to cooperate with the control firmware to obtain an available memory space of the image memory; a functionality to associate a content of a job to be processed with a program running on one or more guest OSs required for that job; a functionality to, before starting the job, read a required guest OS into the available memory space of the image memory and cause the associated program to be executed; and a functionality to restore a content of the system memory determined as not being used by the host OS and another guest OS to the image memory to allow the system memory to be used as a system memory for a newly run guest OS.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart which shows a processing procedure involved in ensuring a memory in an exemplary processing 2 done by the control unit of the image formation apparatus according to the present embodiment.

FIG. 12 is a flowchart which shows a procedure of a process for management of a memory area in the control unit of the image formation apparatus according to the present embodiment.

DESCRIPTION OF THE PREFERRED EMBODIMENTS

Figure 1:
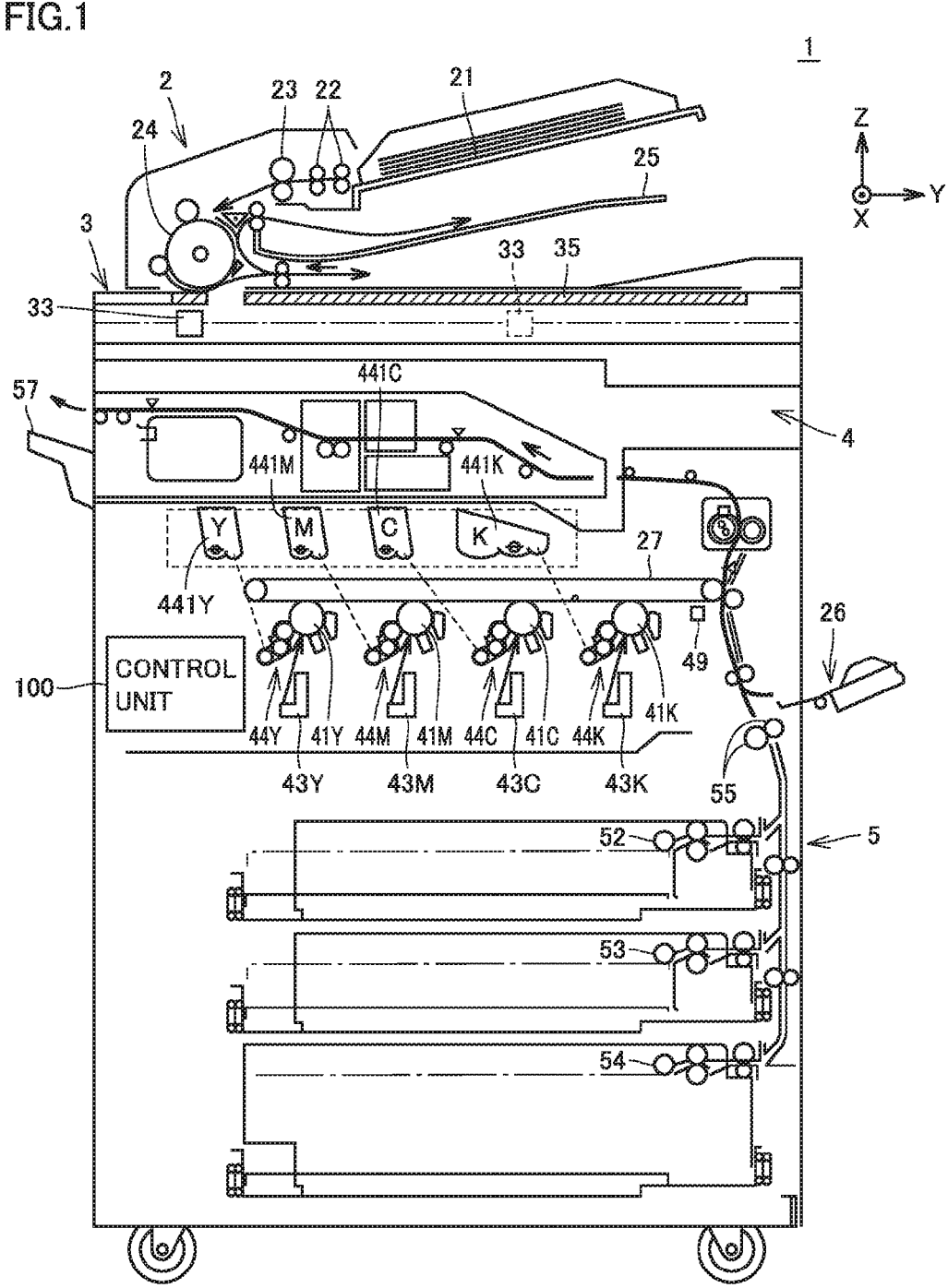
FIG. 1 is a schematic cross section showing a general configuration of an image formation apparatus according a present embodiment.

The present invention will now be described in embodiments hereinafter in detail with reference to the drawings. Note that in the figures, identical or corresponding components are identically denoted, and accordingly, will not be described repeatedly.

<A. Outline of Issue and Solution Means>

Initially, a solution means adopted in an image formation apparatus according to an embodiment of the present invention will be outlined together with an issue in a related art.

As has been described above, in a visualization environment in which a conventional hypervisor etc. is applied to an image formation apparatus, when resources such as memory run short, then regardless of whether they may be required to process a job, a delay time can be introduced before a guest OS has completely been started or run and an application has completely been started or run on the guest OS.

In other words, as has been described above, a time delay caused in switching to the guest OS as a processing is performed to restore a content of the system memory is an issue, and such an issue is unsolvable simply by combining a conventional image formation apparatus with a conventional hypervisor.

The present inventors, as a result of a diligent study, have arrived at a new idea, i.e., utilizing a system memory that is provided separately from a system memory to implement a virtualization environment in an image formation apparatus as a means to solve these issues. In other words, as a design of a memory configuration inherent to an image formation apparatus, a system memory utilized to execute vinous programs including an OS and in addition thereto an image memory utilized to process a job are prepared. The image memory is assigned a relatively large memory space exclusively for processing a job. Preferably, the image memory is mounted as a storage device other than a disc medium with access speed etc. considered. Typically, the image memory is RAM (Random Access Memory) such as DRAM.

In addition, the image memory is a memory space which a control firmware running on a host OS operates and manages, and if a guest OS and a hypervisor access these memory spaces freely, there is also a possibility that processing a job may fail. Generally, a form of utilization varies depending on types of memory e.g., a system memory, a sub memory (IO access), an input output buffer, and other similar memory optimized depending on the processing. However, a conventional hypervisor's main processing is competition management of a memory space used by guest OSs, and cannot understand a content of a dedicated memory space (or image memory) used by an individual OS. Furthermore, the conventional hypervisor cannot perform detailed memory control for a dedicated memory space used by an individual OS, either.

By cooperating with the control firmware running on the host OS, a state of an access to the image memory, a state of storage of data in the image memory, etc. may be obtained to implement detailed memory control. However, it is not preferable that, in order for the hypervisor to cooperate with the control firmware, excessive switching to the host OS to operate the control firmware is caused and exclusive control between a plurality of control entities regarding the image memory and other similar excessive loads are caused.

In an image formation apparatus according to the present embodiment, an image memory utilized for processing a job is utilized as a temporary restore memory (a swap memory) required to run a guest OS to rapidly switch and thus run a plurality of OSs so that even a job required to be processed on the host OS can be preferentially processed with a minimized delay time. Furthermore, the image formation apparatus according to the present embodiment adopts a control method allowing such system and image memories' respective memory spaces to be efficiently utilized.

<B. General Configuration of Image Formation Apparatus>

Hereinafter, a general configuration of an image formation apparatus 1 according to the present embodiment will be described.

With reference to FIG. 1, image formation apparatus 1 includes an automatic document feeder 2, an image scanner 3, a print engine 4, a sheet feeding portion 5, and a control unit 100.

Automatic document feeder 2 is for scanning originals successively, and includes an original feeding plate 21, a delivering roller 22, a resist roller 23, a transportation drum 24, and a discharged-sheet receiver 25. An original to be scanned is set on original feeding plate 21 and sent out one by one as delivering roller 22 operates. And the sent original is once stopped by resist roller 23 and has an end adjusted and is then transported to transportation drum 24. Furthermore, the original rotates together with a drum surface of transportation drum 24, and, during that process, has an image plane scanned by image scanner 3, which will be described later. Subsequently, at a position which is generally half round the drum surface of transportation drum 24, the original is separated from the drum surface and discharged to discharged-sheet receiver 25.

Image scanner 3 includes an image pickup device 33 and an original mount 35. Image pickup device 33 temporally varies a relative position relative to a photographic subject or the original and thus reads the original's image to generate image data. Data containing this image data is processed as a job. Image pickup device 33 includes as main components a light source which irradiates the original with light, an image sensor which obtains an image which is generated as the light emitted from the light source is reflected by the original, an AD (analog-to-digital) converter for outputting an image signal from the image sensor, and an imaging optical system. disposed at a stage preceding the image sensor. The image sensor typically includes a CCD (Coupled Charged Device) image sensor, a contact image sensor, or the like. Note that the original to be scanned can also be set on original mount 35. Furthermore, double-sided simultaneous scanning may be implemented by disposing image pickup devices on the sides of the front and back surfaces, respectively, of the original.

By print engine 4, as an example, an image formation process in an electrophotography system is performed. Specifically, full color print output can be done. Specifically, print engine 4 includes an imaging (or image forming) units 44Y, 44M, 44C, 44K generating a toner image of each color of yellow (Y), magenta (M), cyan (C), and black (K). Imaging units 44Y, 44M, 44C, 44K are disposed in that order along a transfer belt 27 tensioned in print engine 4 and thus driven.

Imaging units 44Y, 44M, 44C, 44K include image writing portions 43Y, 43M, 43C, 43K and photoreceptor drums 41Y, 41M, 41C, 41K, respectively. Image writing portions 43Y, 43M, 43C, 43K each include a laser diode which emits laser light corresponding to an image of each color included in the print data of interest, and a polygon mirror which deflects the laser light to expose a surface of an associated one of photoreceptor drums 41Y, 41M, 41C, 41K thereto in a main scanning direction.

On the surfaces of photoreceptor drums 41Y, 41M, 41C, 41K, electrostatic latent images are formed by the exposure done by image writing portions 43Y, 43M, 43C, 43K as described above, and these electrostatic latent images are developed as toner images by toner particles supplied from toner units 441Y, 441M, 441C, 441K associated therewith, respectively.

The toner image of each color developed on the surface of each of photoreceptor drums 41Y, 41M, 41C, 41K is sequentially transferred to transfer belt 27. Furthermore, the toner images superposed on transfer belt 27 one on another are further transferred to a recording paper timely supplied from sheet feeding portion 5.

The toner image transferred on this recording paper is fixed in a downstream fixing portion, and thereafter discharged on tray 57.

In parallel with the operation done by photoreceptor drums 41Y, 41M, 41C, 41K described above, of delivering rollers 52, 53, 54 associated with sheet feeding cassettes, respectively, of sheet feeding portion 5 having recording papers accommodated therein, and a manual sheet feeding portion 26, a portion corresponding to a recording sheet to be used to form an image operates and supplies the recording sheet. The supplied recording paper is transported by transportation rollers 55 and 56 and a timing roller 51 and fed to photoreceptor drum 41 in synchronization with the toner image formed on photoreceptor drum 41.

A transfer unit 45 applies a voltage of an opposite polarity to photoreceptor drum 41 to transfer to a recording sheet the toner image formed on photoreceptor drum 41. And a diselectrifier 46 diselectrifies the recording sheet having the toner image transferred thereon to separate the recording sheet from photoreceptor drum 41. Subsequently, the recording sheet having the toner image transferred thereon is transported to a fixing device 47. Note that, as transfer unit 45, in place of a transfer system using the transfer belt as shown in FIG. 1, a transfer system using a transfer charger or a transfer roller may be adopted. Alternatively, in place of a direct transfer system in which a toner image is transferred directly from photoreceptor drum 41 to a recording sheet, between photoreceptor drum 41 and a recording sheet an intermediate transfer body such as a transfer roller and a transfer belt may be disposed to perform transfer by a process in two steps or more.

Fixing device 47 includes a heating roller 471 and a pressurization roller 472. Heating roller 471 heats a recording sheet to melt toner transferred thereon and also cooperates with pressurization roller 472 to apply compressive force to fix the molten toner on the recording sheet. And the recording sheet is discharged on tray 57. Note that, as fixing device 47, in place of a fixing system using the fixing belt as shown in FIG. 1, a fixing system using a fixing roller etc. or a contactless fixing system may be adopted.

Photoreceptor drum 41 having the recording sheet separated therefrom has its residual potential removed and subsequently has residual toner removed by a cleaning portion and is thus cleaned. And a next image formation process is performed. The cleaning portion is by way of example a cleaning blade, a cleaning brush, a cleaning roller or a combination thereof to remove and clean residual toner. Alternatively, a cleanerless system may be adopted which collects residual toner using photoreceptor drums 41Y, 41M, 41C, 41K.

An IDC sensor 49 senses a density of a toner image formed on photoreceptor drum 41. IDC sensor 49 is representatively a light intensity sensor which is composed of a reflection type photosensor, and senses the intensity of the light reflected from a surface of photoreceptor drum 41.

Control unit 100 is responsible for controlling image formation apparatus 1. In control unit 100 of image formation apparatus 1 according to the present embodiment, a virtualization environment allowing a plurality of OSs to be started simultaneously (or in parallel) is implemented. As the plurality of OS, there are a host OS at least run and a guest OS run as appropriate in response to a request or the like. In other words, the host OS is not restored.

A process for implementing the virtualization environment will be detailed later.

<C. Hardware Configuration of Control Unit 100 of Image Formation Apparatus 1>

Hereinafter, a hardware configuration of control unit 100 of image formation apparatus 1 according to the present embodiment will be described.

Figure 2:
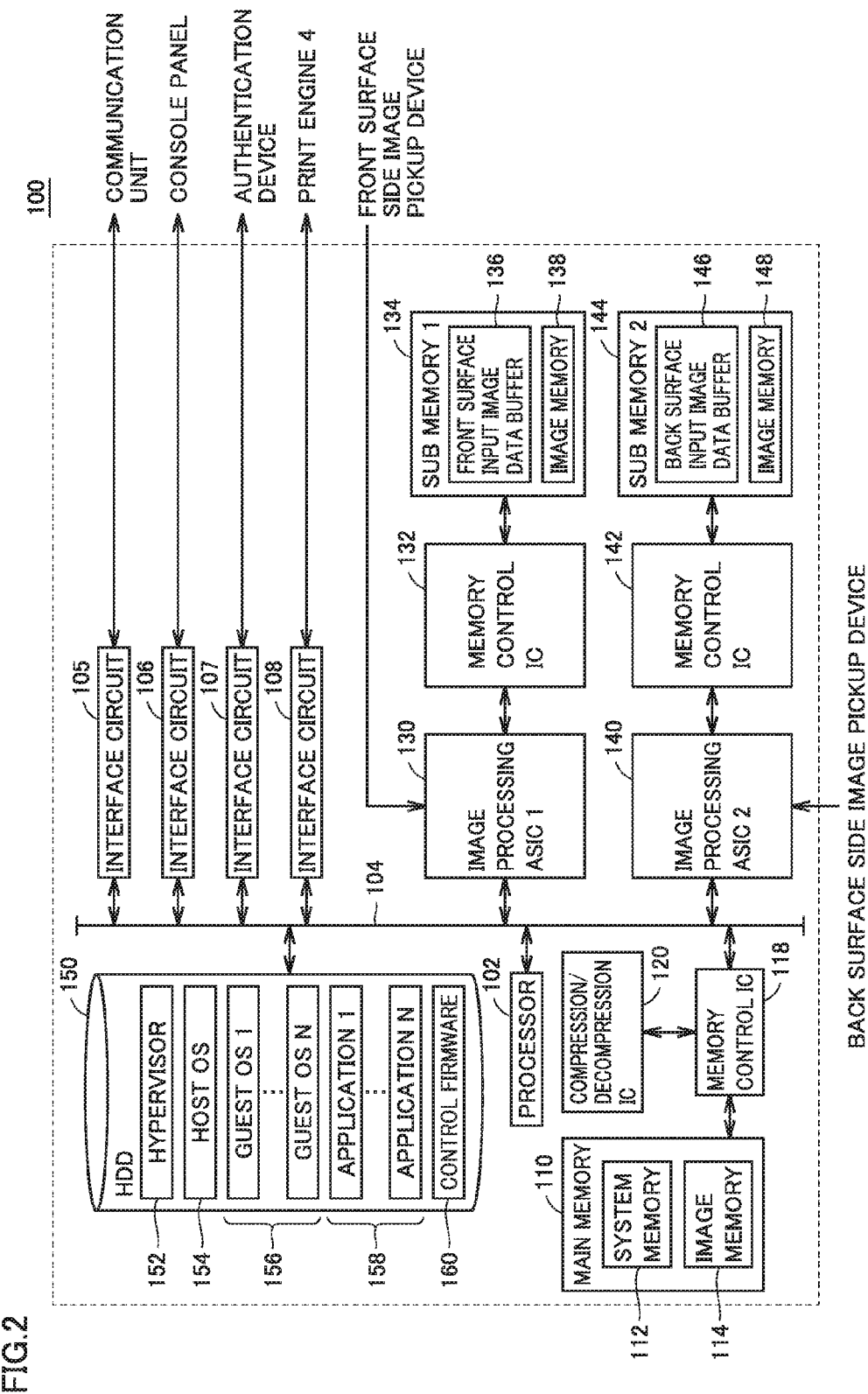
FIG. 2 is a block diagram showing a hardware configuration of a control unit of the image formation apparatus according to the present embodiment.

With reference to FIG. 2, control unit 100 is an operation processing entity controlling the entirety of image formation apparatus 1, and has one or a plurality of computation portions. More specifically, control unit 100 includes as main components a processor 102 which is composed of a CPU (Central Processing Unit) or an MPU (Micro Processing Unit), a main memory 110 composed of DRAM etc., image processing ASICs (Application Specific Integrated Circuits) 130, 140, interface circuits 105, 106, 107, 108 which communicate a signal or data with each component of image formation apparatus 1, and a HDD (Hard Disk Drive) 150 which is an example of a secondary storage device. These components are configured to be capable of mutual data communication via an internal bus 104.

Main memory 110 has a physical memory space divided into a system memory 112 and an image memory 114 and used in applications depending on them, respectively. System memory 112 is used as a work memory for storing various data for executing a program in processor 102. Image memory 114 is used for buffering image data temporarily created during a process such as editing, processing and displaying the image data. For example, it is used as an image buffer used in synthesizing a plurality of image data, an image buffer in displaying all or a portion of image data on a console panel for preview, etc.

Between main memory 110 and internal bus 104, a memory control IC (Integrated Circuit) 118 is disposed, and in response to a request from processor 102 etc., writes data to main memory 110 or reads data from main memory 110. Note that a compression/decompression IC 120 is connected to memory control IC 118, and compresses the image data that is written to main memory 110 on a bock basis and decompresses image data read from main memory 110. By such a compression and decompression management, efficient memory space utilization and rapid processing are implemented.

As an example, a configuration which can scan an original's opposite surfaces at a time is illustrated to FIG. 2. More specifically, control unit 100 includes an image processing ASIC 130 which processes image data read as an image pickup device disposed on the side of the front surface of an original (hereinafter also referred to as a front surface side image pickup device) scans the original, and an image processing ASIC 140 which processes image data read as an image pickup device disposed on the side of the back surface of the original (hereinafter also referred to as a back surface side image pickup device) scans the original. By adopting such a configuration, in response to an increased need for scanning, increased productivity by double-sided simultaneous scanning can be implemented.

Note that in place of image processing ASICs 130 and 140, processor 102 may be adapted to perform image processing, however, in order to process a job more rapidly, adopting a circuit logic such as ASIC is preferable.

Image processing ASIC 130 receives image data from the front surface side image pickup device and stores the image data to a sub memory 134. Between image processing ASIC 130 and sub memory 134, a memory control IC 132 is disposed, and mediates writing data to sub memory 134 and reading data from sub memory 134. Sub memory 134 has a physical memory space divided into a front surface input image data buffer 136 for storing image data received from the front surface side image pickup device, and an image memory 138, and used in applications depending on them, respectively. Image memory 138 is used for buffering image data temporarily created during a process such as editing, processing and displaying the image data. For example, it is used as an image buffer used when converting image data (raw data) received from the front surface side image pickup device into a designated image format, an image buffer used when transmitting a FAX, an image buffer used when outputting image data to an external network or an external device, or the like.

Similarly, image processing ASIC 140 receives image data from the back surface side image pickup device and stores the image data to a sub memory 144. Between image processing ASIC 140 and sub memory 144, a memory control IC 142 is disposed, and mediates writing data to sub memory 144 and reading data from sub memory 144. Sub memory 144 has a physical memory space divided into a back surface input image data buffer 146 for storing image data received from the back surface side image pickup device, and an image memory 148, and used in applications depending on them, respectively.

In HDD 150, various programs are stored in a non-volatile manner. Specifically, HDD 150 has stored thereon a hypervisor 152, a host OS 154, one or more guest OSs 156, one or more applications 158, and a control firmware 160. These programs may be installed via a DVD-ROM (Digital Versatile Disk Read Only Memory) or a similar optical recording medium, a magnetic recording medium, a semiconductor recording medium, a magneto-optical storage medium, or a similar non-transitory computer readable storage medium. Alternatively, a required program may be downloaded from a server device etc. (not shown) via a wired communication line or a wireless communication line and installed in control unit 100. Each program's details, when the program is executed, and the like will be described later.

Interface circuits 105, 106, 107, 108 are connected to internal bus 104.

Interface circuit 105 is connected to a FAX communication portion which transmits and receives FAX, and/or a network communication which communicates data with another device over a network. Interface circuit 105 receives a command from processor 102, etc. and in response thereto, mediates a process for transmission to the external device from the communication portion, a process for receiving data from the external device by the communication portion, etc. Note that it may mount a function to utilize in an external terminal a function which guest OS 156 provides.

Interface circuit 106 mediates a process for displaying a variety of information on the console panel, a process for receiving a user operation done to the console panel, etc. The console panel is a display and operation portion which receives a touch operation done by the user, and typically includes an LCD (Liquid Crystal Display: a liquid crystal display portion) which serves as a display portion, and a touch panel which receives the touch operation. Note that the display portion may have a function mounted therein to visualize how host OS 154 and guest OS 156 operate. For example, on the display portion, an amount of free memory space, the processor's utilization time and the like may be numerically displayed. In other words, image formation apparatus 1 may have a display portion which displays information on guest OS 156.

Interface circuit 107 mediates communication of data with various authentication devices. The authentication devices include an IC card reader, a fingerprint reader, a short-distance wireless communication device, etc.

Interface circuit 108 mediates communication of data between processor 102 and print engine 4.

In control unit 100 shown in FIG. 2, three image memories, i.e., an image memory 114 in main memory 110, an image memory 138 in sub memory 134, and an image memory 148 in sub memory 144 are prepared.

The image memory is a memory utilized in image processing in the body of image formation apparatus 1. Such an image memory is an essential configuration in image formation apparatus 1. As shown in FIG. 2, the image memory may be ensured as a dedicated image processing area on main memory 110 or as a dedicated image processing area on a local memory provided for each of image processing ASICs 130 and 140 (i.e., sub memories 134 and 144). As has been described above, not only for image processing ASIC 130 for the front surface, but also for image processing ASIC 140 for the back surface, a local memory (sub memory 144) is provided and an image memory is provided on this local memory to implement rapid scanning.

Thus, as a design of a memory configuration of image formation apparatus 1, it is also often the case that a dedicated area is ensured depending on each purpose.

Furthermore, the image processing ASIC and sub memory (or image memory) as shown in FIG. 2 may also be added in a printing process (the image formation apparatus) when image formation apparatus 1 is connected to an external print server for example. Thus, more image memories may also be added when a function of image formation apparatus 1 is extended, and a multi-operation is implemented by utilizing these image memories simultaneously.

<D. Virtualization Environment in Control Unit 100 of Image Formation Apparatus 1>

Hereinafter, a virtualization environment in control unit 100 of image formation apparatus 1 according to the present embodiment will be described.

Figure 3:
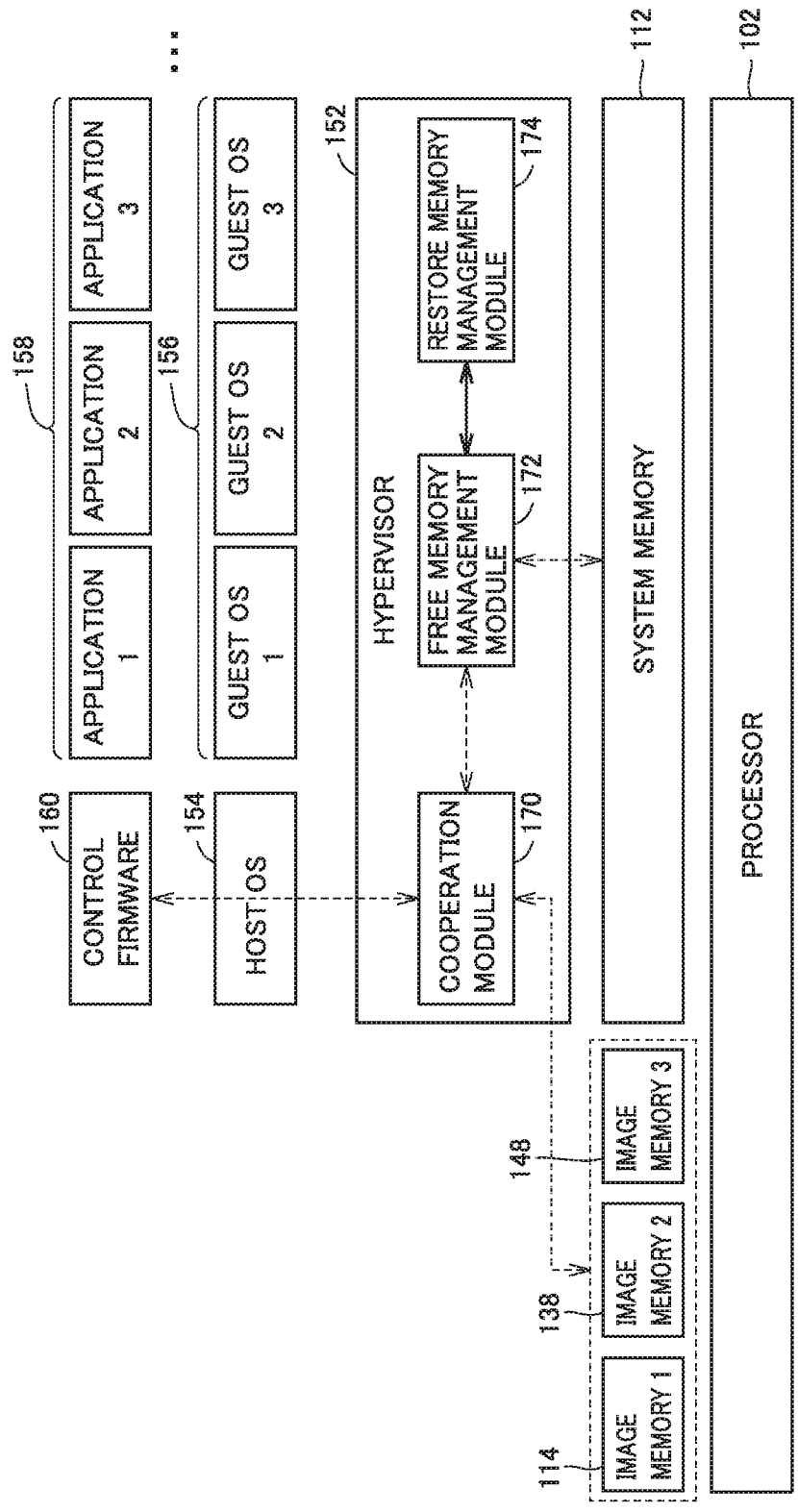
FIG. 3 is a schematic diagram showing an example of a state of executing a program in the control unit of the image formation apparatus according to the present embodiment.

FIG. 3 shows a state where in addition to host OS 154, three guest OSs 156 (guest OS 1-OS 3) are simultaneously running. With reference to FIG. 3, these OSs run using common hardware resources (i.e., processor 102 and system memory 112). FIG. 3 shows a state where processor 102 develops hypervisor 152 in system memory 112 and runs it so that a plurality of OSs are simultaneously running. In other words, a memory space which stores data for operating a respective OS is prepared in system memory 112. Controlling utilization of memory space of system memory 112 (such as assigning a memory area) is managed by hypervisor 152.

Hypervisor 152 uses resources including processor 102 and system memory 112 to control simultaneously running a plurality of OSs including host OS 154 and at least one guest OS 156. Hypervisor 152 performs a process for assigning a virtualized processor resource required for running each OS, an interrupt processing, memory control, provision of a device driver, etc. By providing such processing, a plurality of guest OSs 156 can be switched and thus run. Hypervisor 152 has a function to perform appropriate initialization for guest OS 156 to utilize image formation apparatus 1 and a device connected to image formation apparatus 1. With such a function, even immediately after switching to guest OS 156, a processing similar to that on host OS 154 can be performed.

Note that, as a function of hypervisor 152, in addition to memory space management, electric power management may also be performed. For example, hypervisor 152 may have mounted a function therein to limit an operation of guest OS 156 when image formation apparatus 1 is in a power saving mode.

Host OS 154 is an OS constantly run in control unit 100. On host OS 154, control firmware 160 is running. As host OS 154, an OS having a virtual memory mechanism such as Linux (registered trademark) is used. Note, however, that host OS 154 is not a general-purpose OS; rather, to accept intervention control done by a cooperation module 170, as will be described later, a unique function is extended in image formation apparatus 1.

Control firmware 160 is running on host OS 154 and responsible for controlling image formation apparatus 1. More specifically, control firmware 160 is in charge of controlling a main processing of image formation apparatus 1 (or an operation of the body), processing a job mainly controlling image processing ASICs 130, 140 handling image memories, controlling various devices, etc.

Guest OS 156 may be an OS identical in type to host OS 154 or may be a different type of OS as long as it is an OS having a virtual memory function. For example, Linux, Windows (registered trademark), etc. can be used as guest OS 156.

Various applications 158 are executed on guest OS 156. For example, application 158 can include an application which performs user authentication. Furthermore, a function may be mounted to implement a desktop environment on guest OS 156 for each user of image formation apparatus 1 and manage job content. Note that a scheme may be adopted that is analogous to an app store providing guest OS 156 with any program.

Furthermore, cooperation module 170 and a free memory management module 172 are running as a portion of a function of hypervisor 152 or an independent function which cooperates with hypervisor 152.

Cooperative module 170 operates on the same level as hypervisor 152, mediates between control firmware 160 and hypervisors 152, and utilizes memory space in cooperation with guest OS 156 simultaneously running. The "same level" means a state where priority of execution, etc. is executed on the same level. In the present embodiment, cooperation module 170, considering an operation of a job to be processed, efficiently utilizes an image memory to perform prefetching and restoring memory content for switching guest OS 156. Note that cooperation module 170 may have a function to share the user management information on any of guest OSs 156 with control firmware 160 before restoring if necessary.

Free memory management module 172 manages a free memory space of system memory 112 that is not used by host OS 154 or guest OS 156 which is running simultaneously with host OS 154. In other words, free memory management module 172 manages a free memory space which is not used in a physical memory space managed by hypervisor 152. At the time, free memory management module 172 operates in cooperation with cooperation module 170 to manage a free memory space including an image memory space. An API (Application Programming Interface) for managing cooperation module 170 may be mounted to enhance cooperation between modules.

Furthermore, a restore memory management module 174 may further run. Restore memory management module 174 performs a processing in which, of data stored in the system memory or an image memory, data other than guest OS is restored to HDD 150 at a temporary restore memory (or swap memory) which is an example of the secondary storage device. Alternatively, restore memory management module 174, in contrast, also performs a processing which returns the data restored in the temporary restore memory (or swap memory) to the system memory or the image memory.

Note that regarding host OS 154 and guest OS 156, it is preferable to restore data to an image memory with successive memory spaces prioritized.

A function may be mounted to perform a migration processing appropriately to cause a program on one guest OS 156 to be executed on another guest OS 156. Thus, if some failure arises in one guest OS 156, another guest OS 156 can continue a processing of an application. In other words, cooperation module 170 further includes a function which moves and manages data content restored when guest OS 156 is migrated to an external system.

Furthermore, a server type or resident program which manages image formation apparatus 1 may manage a configuration of guest OS 156 to select guest OS 156 to run and an application to be executed on each guest OS 156 to allow a plurality of image formation apparatuses 1 and an image formation apparatus group as a whole to be an optimal configuration.

By the way, it is often the case that, as shown in FIG. 2, a plurality of image memories are often prepared in control unit 100 of image formation apparatus 1. On the other hand, it is also often the case that image formation apparatus 1 does not have all image memories used at a time such as when a print operation (an image forming operation) is alone successively performed or when an original has one surface alone scanned.

Furthermore, in general, image memory is managed for compression and decompression on a bock basis. Furthermore, a configuration is also adopted in which image memory is divided by a unit and commonly used to allow a plurality of tasks to utilize physical memory efficiently.

While, as in image formation apparatus 1 according to the present embodiment, a plurality of guest OSs may be mounted to be multi-functional, the guest OSs may consume a large amount of memory. Furthermore, while there is a demand for implementing a multi-OS which operates a plurality of guest OSs, there is an issue similar to a case of implementing a general virtual environment. Accordingly, it is not easy to implement multi-OS within an image formation apparatus's limited resources without impairing a response performance for switching a plurality of OSs.

For example, as has been set forth above, Japanese Laid-Open Patent Publication No. 2001-256066 discloses an environment in which a plurality of operating systems allowed to co-exist in a single system can be rapidly switched and thus used. Japanese Laid-Open Patent Publication No. 2001-256066 describes an invention in which an independent memory space outside OS management is ensured on a system memory in advance and used to store a guest OS's operational context. However, if such a configuration is adopted there is a limitation in ensuring the independent memory space on the system memory, and furthermore, when memory space runs out it is inevitable to use the secondary storage device together and accordingly a delay is caused and thus there is also a case where it is difficult to rapidly switch and thus run a plurality of OSs.

Furthermore, as has been set forth above, Japanese Laid-Open Patent Publication No. 2014-238665 describes that a first OS user name is used as a second OS user name to simplify a login procedure to allow a second OS login procedure to be performed fast. However, when an image processing job is generated, and a resource such as memory runs short, then, to deliver over a resource to the first OS of body control, a logout processing time for the second OS's resource-releasing is introduced, and starting an image processing may be delayed. In particular, resource confirmation details are not disclosed and there is no mention of image memory, and accordingly, when from a flow procedure followed when a resource runs out the second OS is ended to release a resource, a long period of time is taken for the ending procedure. This introduces an increased delay before executing a first OS job is started, and thus has a large effect on job productivity.

Accordingly, image formation apparatus 1 according to the present embodiment utilizes a system memory and in addition an image memory's memory space efficiently without affecting processing a job to implement an environment in which a plurality of OSs are rapidly switched and thus run.

<E. Example 1 of Processing a Job in Image Formation Apparatus 1>

Hereinafter Example 1 of processing a job in image formation apparatus 1 according to the present embodiment will be described. As exemplary processing 1 will be described a process for assigning a memory space to host OS 154 and guest OS 156 when confidential FAX is processed as a single job and accordingly an authentication process is required in guest OS 156. Herein, confidential FAX is a function to communicate FAX only with a specific party via authentication such as by a registration number or a password.

In a case of an example in which a state of an operation of the body of image formation apparatus 1 continues in such an order as a state before starting a job, followed by a scan operation, followed by FAX reception in a confidential mode (with authentication required when printing out), followed by copy print, and the like, then, as shown in the following table, prefetching two guest OSs 136 by cooperation module 170 is performed.

Figure 4:
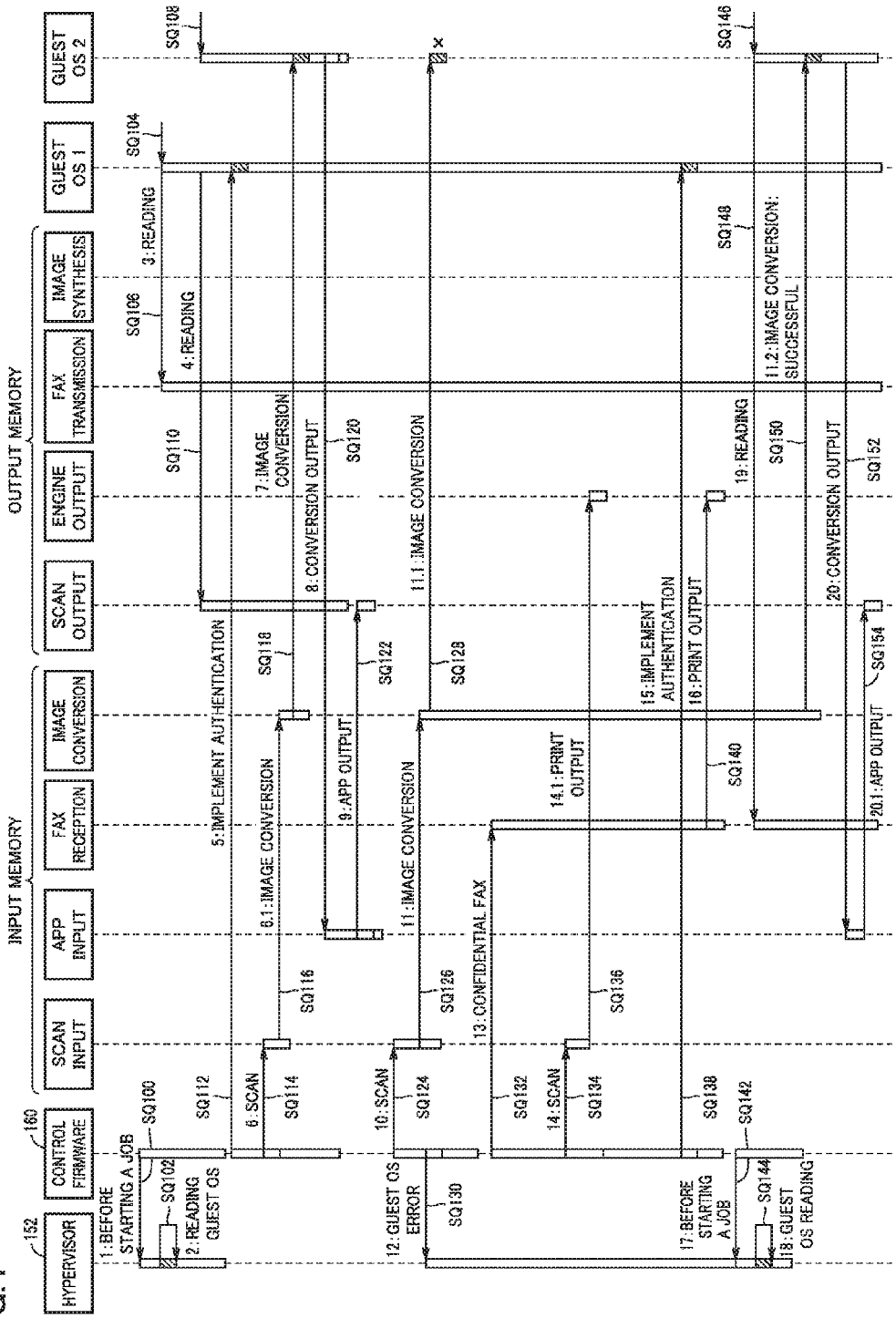
FIG. 4 is a sequence diagram showing a processing procedure in an exemplary processing 1 done by the control unit of the image formation apparatus according to the present embodiment.

FIG. 4 shows a sequence diagram of an example of a single job. Note that a processing when read guest OS 2 is destroyed is also included in FIG. 4.

With reference to FIG. 4, after starting control firmware 160 and hypervisor 152 has been completed, control firmware 160 which manages the body's operation notifies hypervisor 152 that it is before a job is started (Sequence SQ100: "1, before starting a job"). In response to this notification, hypervisor 152 reads guest OS 1 and guest OS 2 (sequence SQ102; "2. Reading guest OSs"). In other words, an instruction is issued to start necessary guest OSs.

In the example shown in FIG. 4, when guest OS 1 is started (sequence SQ104), guest OS 1 reads data in an output memory at an area assigned to FAX transmission (sequence SQ106: "3, reading"). An authentication application is executed in guest OS 1, for the sake of illustration.

Furthermore, when guest OS 2 is started (sequence SQ108), guest OS 2 reads data in the output memory at an area assigned to scan output (sequence SQ110: "4. reading"). An image conversion application is executed in guest OS 2, for the sake of illustration.

When control firmware 160 performs an authentication process before starting a job, it switches to guest OS 1 having been read and instructs guest OS 1 to perform the authentication process in the authentication application executed in guest OS 1 (Sequence SQ112: "5, implementing authentication").

Furthermore, when control firmware 160 performs a scan operation accompanied by image conversion, it writes image data obtained by scanning to an input memory at an area assigned to scan input (sequence SQ114: "6. scan"). Then, the written image data is written to the input memory at an area assigned to image conversion (sequence SQ116: "6.1. image conversion").

Furthermore, control firmware 160 switches to guest OS 2 having been read, and instructs guest OS 2 to perform an image conversion process in the image conversion application executed in guest OS 2. Guest OS 2 writes the image data obtained through the image conversion process (or a conversion result) to the input memory at an area assigned to app input (Sequence SQ120: "8, conversion output"). Furthermore, the written image data is written to the output memory at an area assigned to scan output (sequence SQ122: "9. app output").

Herein after the processing on guest OS 2 when the area of the output memory that is assigned to scan output is occupied by another processing and a memory area available to guest OS 2 cannot be ensured, the image conversion process in guest OS 2 may fail. In other words, guest OS 2 may be destroyed.

For example, when control firmware 160 continuously performs a scan operation accompanied by image conversion, it writes image data obtained by scanning to the input memory at the area assigned to scan input (sequence SQ124: "10. scan"). Then, the written image data is written to the input memory at the area assigned to image conversion (sequence SQ126: "11. image conversion"). Furthermore, control firmware 160 issues an instruction to perform an image conversion process in the image conversion application executed in guest OS 2 (Sequence SQ128: "11.1 image conversion"). Herein, for example if confidential FAX is successively received, it will be impossible to write the image data obtained through the image conversion process (i.e., a conversion result) to the output memory at the area assigned to scan output, and the image conversion process in guest OS 2 may fail. In other words, reading on guest OS 2 cannot be done, and accordingly, a fast response to a next job, i.e., a scan operation accompanied by image conversion, cannot be made and a failure can be determined.

Then, control firmware 160 reports the failure on guest OS 2 to hypervisor 152 as an error (sequence SQ130: "12. guest OS error"). Meanwhile, control firmware 160 processes a following job. After this confidential FAX's job is completed when guest OS 2 is read the previous, image conversion accompanied-scan operation may be resumed.

In the example shown in FIG. 4, control firmware 160 writes received FAX's image data to the input memory at an area assigned to FAX reception (sequence SQ132: "13. confidential FAX"). Then, the written image data undergoes scan print processing, and is subsequently written to the output memory at an area assigned to engine output (sequence SQ140: "16. print output").

Furthermore, control firmware 160 writes the image data obtained by scanning to the input memory at the area assigned to scan input (sequence SQ134: "14. scan"). Then, the written image data is written to the output memory at the area assigned to engine output (sequence SQ136: "14.1. print output").

Subsequently, control firmware 160 switches to guest OS 1 having been read and instructs guest OS 1 to perform an authentication process in the authentication application executed in guest OS 1 (Sequence SQ138: "15. implementing authentication").

After these previous jobs have been processed, control firmware 160 notifies hypervisor 152 that it is before a job is started (Sequence SQ142: "17. before starting a job"). In response to this notification, hypervisor 152 reads guest OS 2 (sequence SQ144: "18. Reading guest OS"). In other words, an instruction is issued to start a necessary guest OS, guest OS 2.

Once guest OS 2 has been started (sequence SQ146), guest OS 2 reads data in the output memory at the area assigned to scan output (sequence SQ148: "19. reading").

After the authentication process on guest OS 2 has been performed, a previous job, i.e., image conversion, is completed, and guest OS 2 is notified that image conversion has been successfully done (Sequence SQ150: "11.2. Image conversion: successfully done").

Furthermore, guest OS 2 outputs information indicating a change of a state (sequence SQ152: "20: variation output"), and the information is written to the output memory at the area assigned to scan output (sequence SQ144: "20.1. app output").

As shown in FIG. 4, when a confidential FAX is previously received and thereafter a confidential FAX is further received, switching to guest OS 1 having been read can be done and the authentication application can be used so that the following received FAX can also be duly printed and output Accordingly, a job as a whole can be finished faster, a period of time required before reading guest OS 2 is shortened, and successive jobs' productivity can also be improved more than when there is no reading control.

A correspondence table is indicated which corresponds to the above described sequence diagram and indicates resources utilized when image formation apparatus 1 processes a single job. In the table, a circle indicates a memory which the job utilizes.

| job state (authentication present/absent) | job | input memory | | | | output memory | | | | guest OS 1 (authentication processing) read state | guest OS 2 (image processing) read state |
|---|---|---|---|---|---|---|---|---|---|---|---|
| | | scan input | app input | FAX reception | image conversion | scan output | engine output | FAX transmission | image synthesis | | |
| before starting a job | implement authentication | | | | | | | | | FAX transmission | scan output |
| authenticated | scan | ○ | | | ○ | ○ | | | | FAX transmission | scan output |
| authenticated | scan failed | ○ | ○ | | ○ | | | | | FAX transmission | x |
| confidential | FAX | | | ○ | | | | | | FAX transmission | x |
| no authentication | copy | ○ | | | | | ○ | | | FAX transmission | x |
| | confidential print | | | ○ | | | ○ | | | FAX transmission | x |
| authenticated | scan | | ○ | | ○ | ○ | | | | FAX transmission | FAX reception |

In the above table, for the sake of illustration, simplifying the process to utilize an image memory in a fixed manner serves as a premise. Note, however, that by dividing and thus managing the image memory, as will be described later, a memory distributed to each image memory and thus existing in a mixed manner can be utilized depending on an OS's priority etc. For example, according to the above described nonpatent document 1, when compared with ensuring a fixed area of a fixed length, more free memory can be expected depending on a plurality of OS states, and the number of guest OSs can advantageously be increased.

Note that when a plurality of authentication devices are used, different guest OSs 156 may be caused to perform their processes, respectively, as shown in the table below:

| authentication device | guest OS |
|---|---|
| card authentication | guest OS1 |
| biological authentication | guest OS2 |
| remote panel authentication | guest OS3 |

Figure 5:
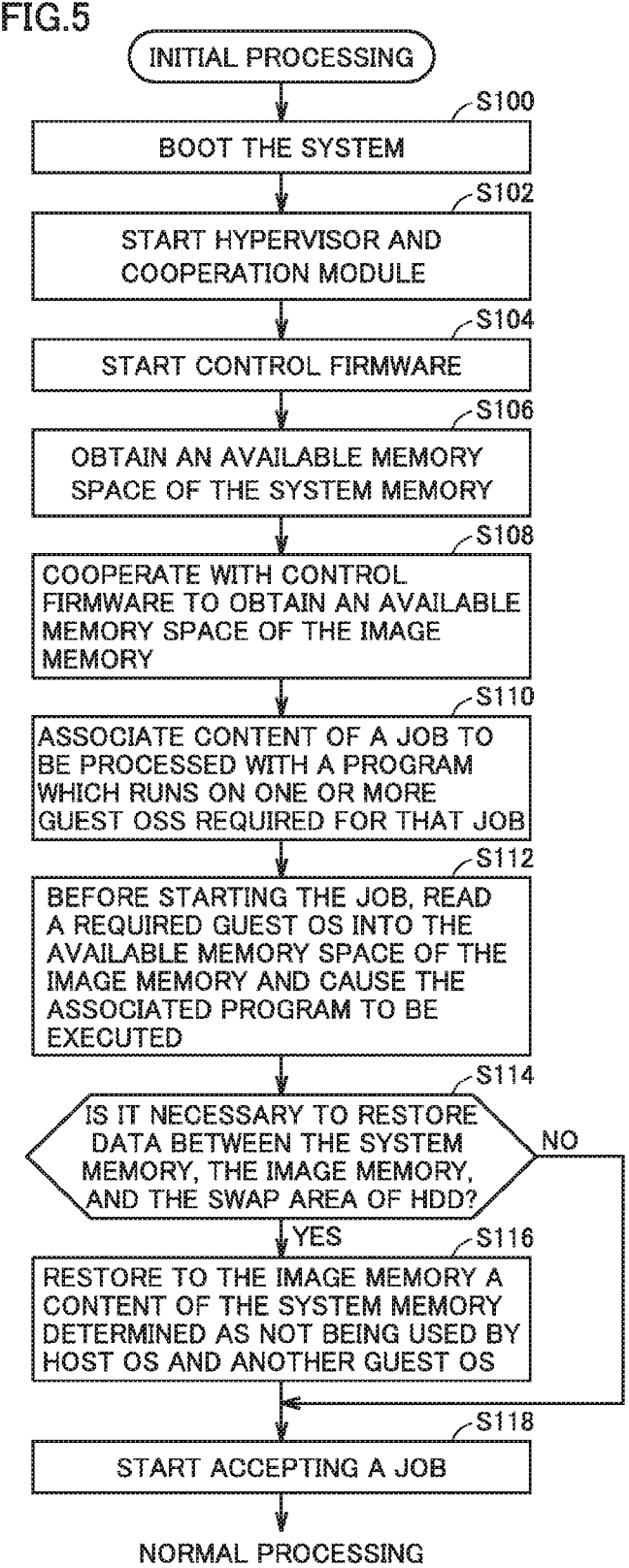
FIG. 5 is a flowchart showing a procedure of an initial processing done by the control unit of the image formation apparatus according to the present embodiment.

Each step indicated in FIG. 5 is implemented mainly by processor 102 of control unit 100 of image formation apparatus 1 performing various programs (not shown) in a designated order.

With reference to FIG. 5, when the system is started (booted) (step S100), processor 102 starts hypervisor 152 and cooperation module 170 (step S102). Furthermore, processor 102 starts control firmware 160 (step S104).

When starting a necessary program is started, processor 102 (cooperation module 170) obtains an available memory space of the system memory (step S106) and also cooperates with control firmware 160 to obtain an available memory space of the image memory (step S108).

Subsequently, processor 102 (cooperation module 170) associates content of a job to be processed with a program which runs on one or more guest OSs required for that job (step S110). For example, for the above described confidential FAX, the information that an authentication application executed on a guest OS is required is registered.

Then, before starting the job to be processed, if information that any of programs is required for the job to be processed is registered in step S110, then, before starting the job, processor 102 (cooperation module 170) reads a required guest OS into the available memory space of the image memory and causes the associated program to be executed (step S112).

Processor 102 (cooperation module 170) determines whether it is necessary to restore data between system memory 112, the image memory, and the swap area of HDD 150 (step S114). When it is determined that it is necessary to restore data (YES in step S114), processor 102 (cooperation module 170) restores to the image memory a content of system memory 112 determined as not being used by host OS 154 and another guest OS 156 (step S116). Thus a memory is made available as system memory of a guest OS newly run.

Subsequently, processor 102 starts accepting a job (step S118). Subsequently, when a job is input, a process corresponding to the input job is performed. Note that not only a request on host OS 154 but a request on guest OS 156 may also be accepted as the body's job.

Thus, for example when an authentication process is required in parallel to processing a job, hypervisor 152 can prefetch guest OS 156 to implement faster job processing.

<F. Example 2 of Processing a Job in Image Formation Apparatus 1>

Subsequently, a memory management utilizing a data structure unique to the image memory will be described. In particular, a processing suitable for utilizing the image memory that is divided into blocks will be described.

Figure 6:
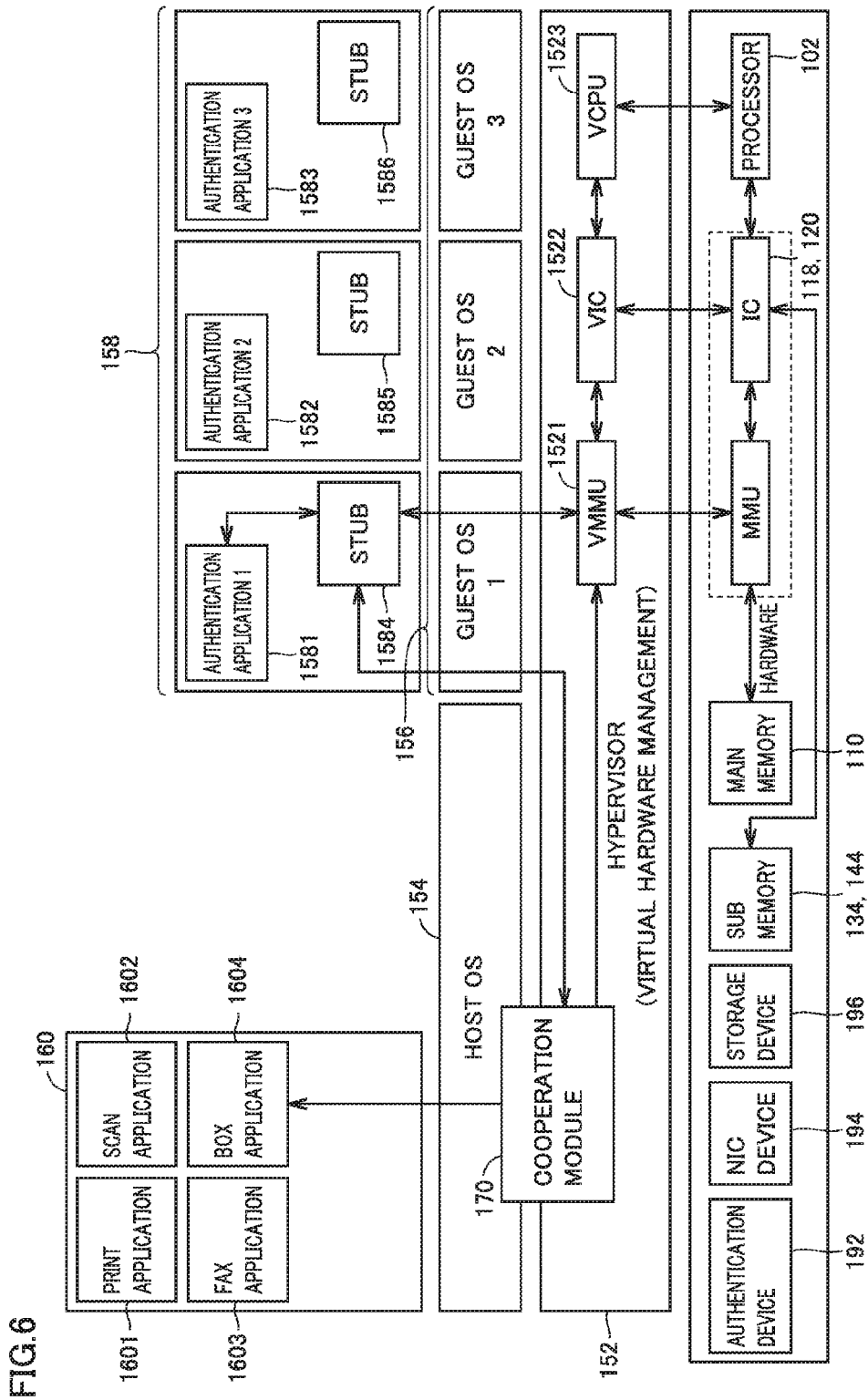
FIG. 6 is a schematic diagram showing an example of a state of differently executing a program in the control unit of the image formation apparatus according to the present embodiment.

With reference to FIG. 6, an example is indicated in which hardware of control unit 100 is utilized to run hypervisor 152, and under management of hypervisor 152, host OS 154 and a plurality of guest OSs 156 are running.

The hardware of control unit 100 includes a function of an MMU (Memory Management Unit) and IC provided by memory control IC 118 and compression/decompression IC 120 (see FIG. 2), processor 102, and main memory 110. Furthermore, the hardware of control unit 100 includes sub memories 134, 144 and in addition thereto an authentication device 192, a NIC (Network Interface Card) device 194, and various storage devices 196.

Hypervisor 152 provides a virtual memory management department (VMMU) 1521, a compression/decompression IC (VIC) 1522, and a virtual computing resource (VCPU) 1523 in a state where a plurality of OSs can utilize them. On host OS 154, a print application 1601, a scan application 1602, a FAX application 1603, and a BOX application 1604 are running. Furthermore, on guest OS 1 to guest OS 3, authentication applications 1581, 1582, 1583 are running, respectively, for the sake of illustration. Hypervisor 152 uses stubs 1584, 1585, 1586 to manage running guest OSs and applications.

The image memory is compressed/decompressed as managed on a block basis. Furthermore, it is assumed that such a configuration is adopted in which the image memory is divided by a unit and commonly used to allow a plurality of tasks to utilize physical memory efficiently.

Regarding host OS 154 and guest OS 156 also, a virtual memory mechanism is used to manage memory space by a fixed page unit. Note that, in the following description, an OS without the virtual memory mechanism is not taken into consideration.

However, the block unit managed in the image memory and the page unit managed using the virtual memory mechanism do not necessarily have the same unit size. Furthermore, between a case where the image memory to be managed is provided in main memory 110 and a case where the image memory to be managed is provided in sub memory 134, 144, how it is handled cannot be the same.

Accordingly, a memory sharing mechanism in host OS 154 and guest OS 156 as well as hypervisor 152 will be required with management unit and control in image formation apparatus 1 considered as a premise.

Image formation apparatus 1 according to the present embodiment has image processing ASICs 130, 140 incorporated therein. Note, however, that an image memory utilized for print control is composed of two types, i.e., image memory 114 in main memory 100 shared with processor 102, and image memories 138,148 in dedicated sub memories 134, 144 associated with image processings ASICs 130, 140. Thus, a form of utilization depending on the job utilizing image memory is applied, and accordingly, a memory area is ensured with the above described unit size, depending on job operation.

Figure 7:
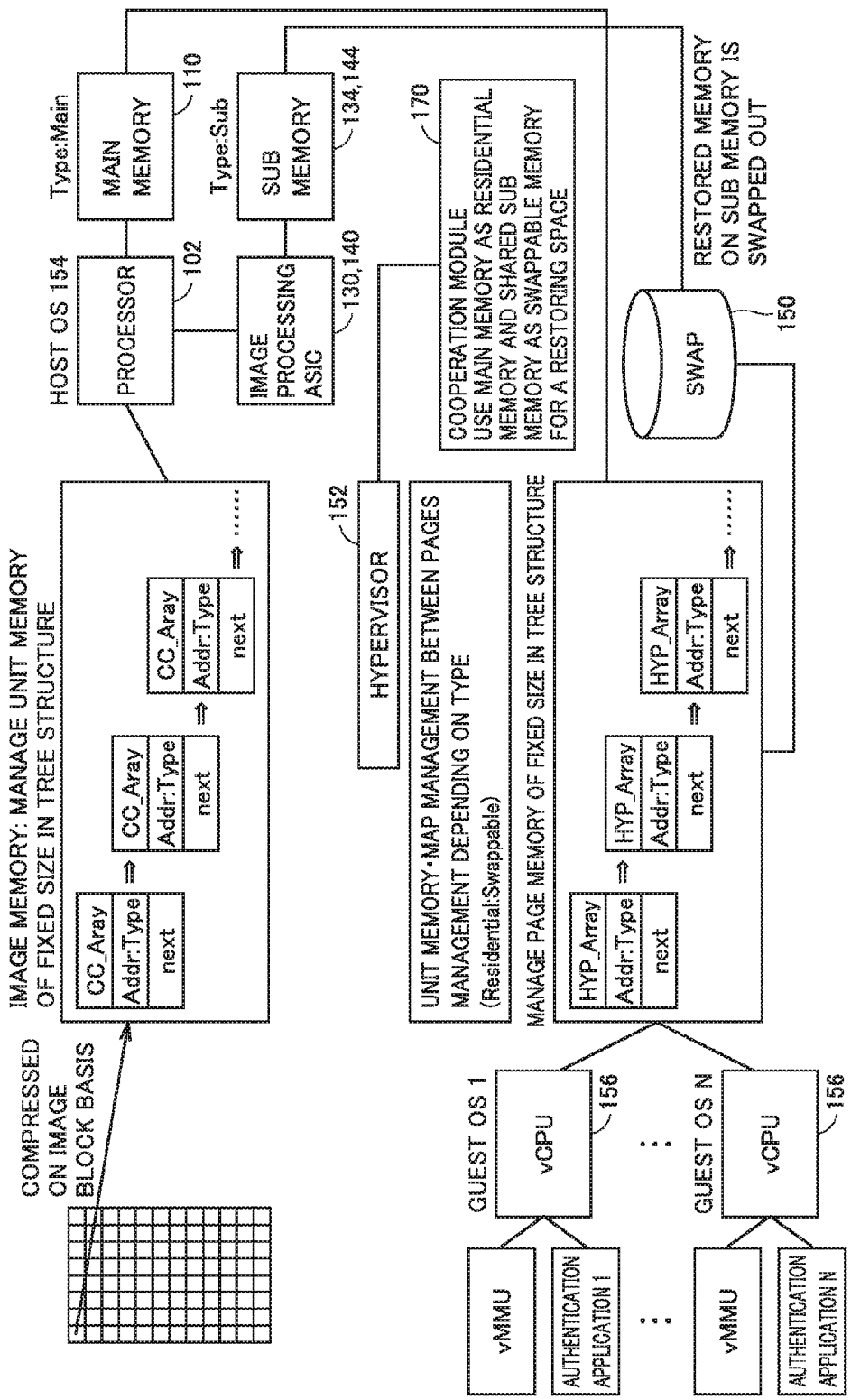
FIG. 7 is a schematic diagram for illustrating a form of utilizing an image memory divided into blocks in the control unit of the image formation apparatus according to the present embodiment.

With reference to FIG. 7, physical image memory is managed for compression and decompression on an image block basis. And a unit memory of a fixed size is managed in a tree structure. More specifically, unit memories are each managed using a data structure in the form of a tree using a linked list, and each unit memory's type and address are stored in an extended address and data structure.

In the configuration as shown in FIG. 7, preferably, cooperation module 170 is configured to operate in cooperation with the image processing ASIC. Such a configuration has high affinity with the virtual memory mechanism of host OS 154, guest OS 156, and hypervisor's 152. On the other hand, such a configuration is configured assuming a conventional image processing depending on job control, and accordingly, it is not taken into consideration for use for a different purpose, using as a memory space which an OS can handle, in particular.

Accordingly, in image formation apparatus 1 according to the present embodiment, a page unit structure in host OS 154 and guest OS 156 as well as hypervisor 152 is assigned to a management unit of image formation and it is managed as a normal memory space to allow even guest OS 156 to also utilize the image memory.

In other words, as the virtual memory, a page memory of a fixed size is managed in a tree structure and any guest OS can use it. The image memory is different in memory response performance depending on the type of the image memory (i.e., between a case where it is provided within main memory 110 and a case where it is provided within sub memory 134, 144). Accordingly, when it is used as a simple memory space, it is accessed regardless of memory response performance, and accordingly, performance as a whole may degrade.

Accordingly, in image formation apparatus 1 according to the present embodiment, cooperation module 170 is mediated between a body OS (host OS 154 and guest OS 156 and hypervisor 152, and depending on the type of the image memory, selective assignment is done as a normal memory space and or a storage memory space.

For example, the storage memory space is set to be swappable and memory management is arbitrated by cooperation module 170 so that swapping is done depending on the job operation. Furthermore, memory having once been paginated is not restored to the storage memory space again; rather, it is handled in the same manner as a normal swap so that fast memory recovery can be done.

In FIG. 7, cooperation module 170 which cooperates with hypervisor 152 may set main memory 110 to be residential and sub memories 134, 144 to be swappable. Furthermore, restored memory on sub memories 134, 144 may be swapped out to a swap space of HDD 150.

For these memory managements, an ID which identifies guest OS 156 is provided to data disposed in a memory space so that it may also be utilized in a function allowing cooperation module 170 to understand that guest OS 156 having been read has been destroyed by executing a job. More specifically, cooperation module 170 senses that the guest OS 156 having been read was destroyed by executing a job and cooperation module 170 reads again the sensed, destroyed guest OS 156 before starting a job.

Figure 8:
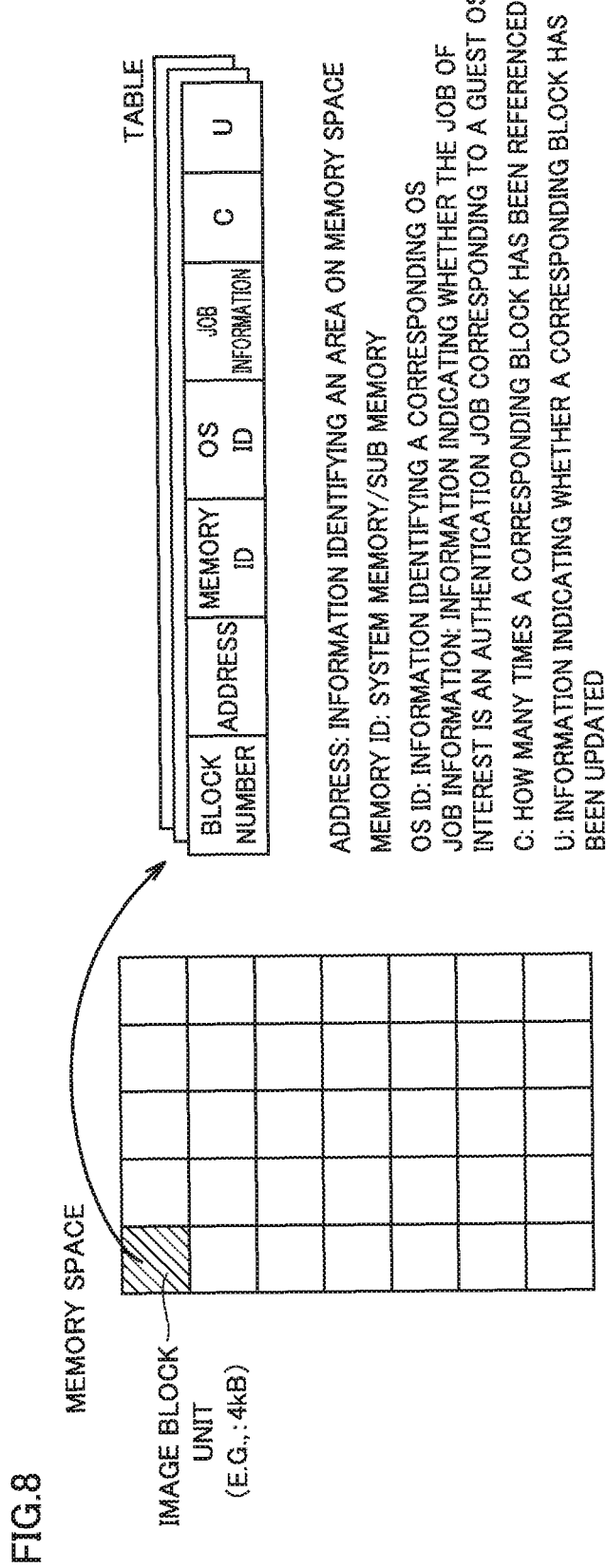
FIG. 8 is a schematic diagram for illustrating a method of managing the image memory divided into blocks in the control unit of the image formation apparatus according to the present embodiment.

With reference to FIG. 8, a table (a column) including attribute information is associated with each image block unit (for example, 4 kByte) within a memory space.

A plurality of pieces of attribute information is stored in this table. In the example shown in FIG. 8, they are a block number, an address, a memory ID, an OS ID, JOB information, C, U, etc.

The block number is information which identifies an area on the memory space. The address is an address of a corresponding block on the memory space. The memory ID indicates whether the memory of interest is an image memory provided on system memory 112 or an image memory provided on sub memory 134, 144. The OS ID indicates an ID of a corresponding OS. The JOB information indicates whether the job of interest is an authentication JOB corresponding to a guest OS. C indicates how many times a corresponding block has been referenced, and U indicates whether a corresponding block has been updated.

Thus, cooperation module 170 has a function to manage a list having a division into types of memory space and including an ID which can identify a utilized OS for each unit memory. Swapping out or writing back etc. is controlled based on such information for each block unit.

Figure 9:
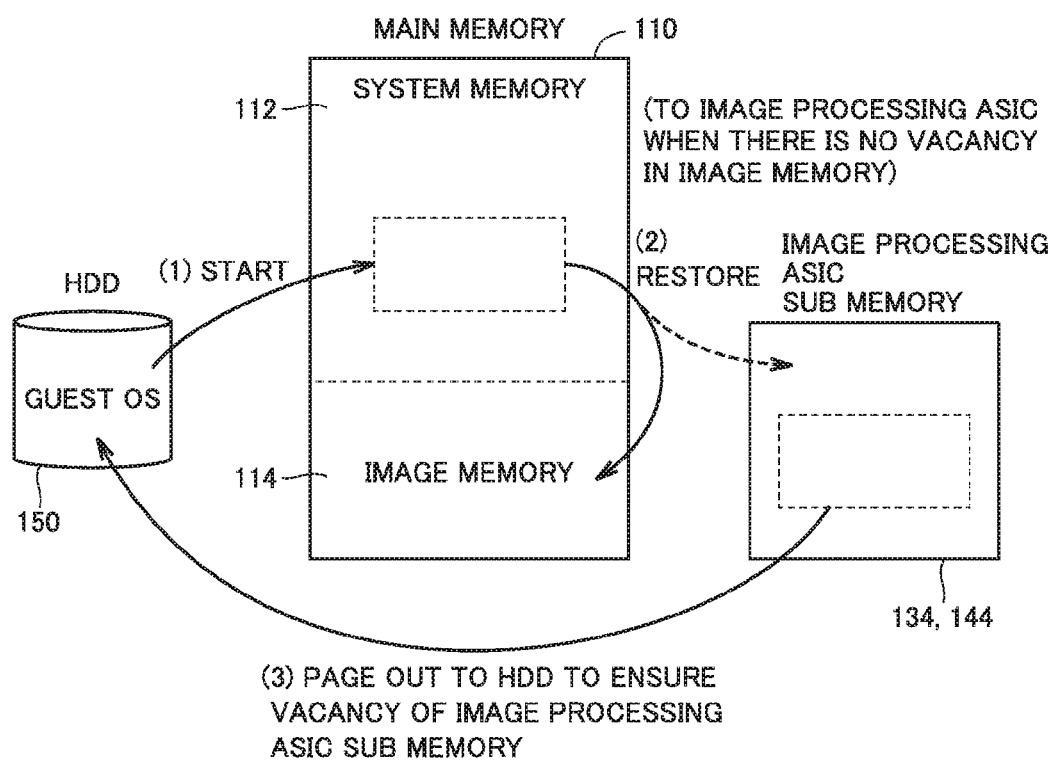
FIG. 9 is a schematic diagram showing an example of data management between a plurality of memories in the control unit of the image formation apparatus according to the present embodiment.

With reference to FIG. 9, in response to a request etc., the hypervisor reads a guest OS from HDD 150 onto system memory 112 within main memory 110, and starts it (start (1)). Subsequently, depending on the circumstances, restoring is done to image memory 114 within main memory 110 ((2) restore). Note that if there is no sufficient free memory space in image memory 114 within main memory 110, a read content may be restored to image memory 138, 148 in sub memory 134, 144 associated with any of the image processing ASICs.

Subsequently, in response to a request for a processing by an image processing ASIC, etc., in order to ensure a sufficient free memory space in sub memories 134, 144, the restored data is paged out to HDD 150.

As shown in FIG. 9, in image formation apparatus 1 according to the present embodiment, between three or four parties, i.e., HDD 150, main memory 110 (including system memory 112 and image memory 114), and sub memories 134, 144 (image memories 138, 148) associated with the image processing ASICs, a data restoring process, a page-out process and the like are implemented in an optimized state depending on a request for using memory, an amount of free memory space, etc.

Figure 10:
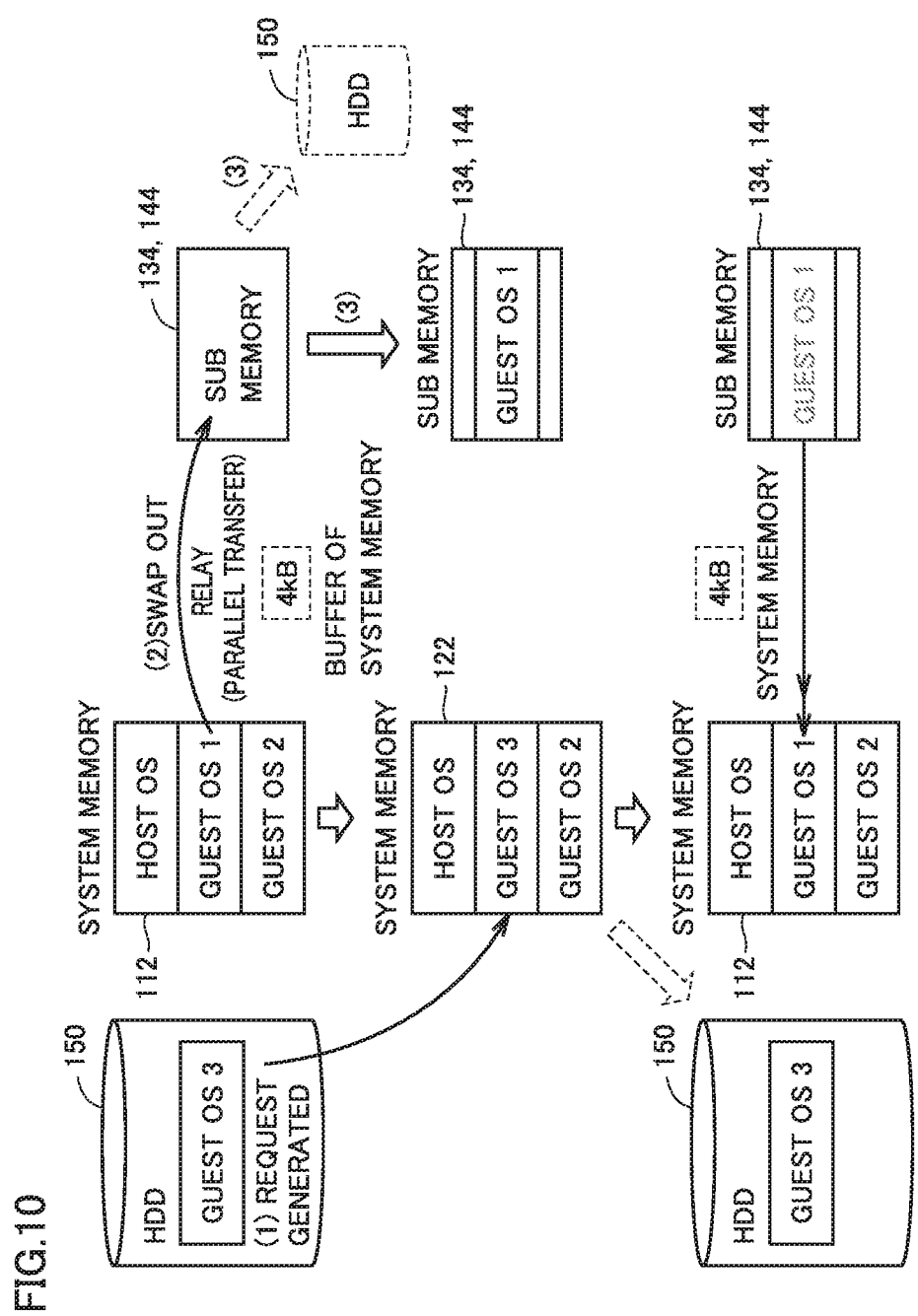
FIG. 10 shows an example of a form of utilizing a memory space in the control unit of the image formation apparatus according to the present embodiment.

With reference to FIG. 10, for example, it is assumed that data required for running a host OS, and guest OSs 1 and 2 is stored in system memory 112 and in that condition an instruction is issued to start guest OS 3 ((1) request generated). Then, cooperation module 170 for example restores (swaps out) a memory area having been assigned to guest OS 1, which is temporarily stopped from running, to sub memory 134.

At the time, data transfer from system memory 112 to sub memory 134 can also be relayed via the system memory and transmitted in parallel on the basis of its buffer capacity (e.g., 4 kB) (i.e., on the block basis).

Subsequently, when it is no longer necessary to run sub OS 3, a content of system memory 112 is swapped out to HDD 150, and written back to system memory 112 from sub memory 134.

Thus, cooperation module 170 performs memory transfer on the block basis in parallel until system memory 112 required is available, and cooperation module 170 assigns guest OS 156 a memory space. And after the memory transfer has been completed, cooperation module 170 performs switching to guest OS 156. Furthermore, thereafter when cooperation module 170 performs switching to host OS 154, cooperation module 170 operates in succession a process to temporarily freeze the system memory which the previously run guest OS and a program which runs on that guest OS 156 utilize, a process to sequentially replace the previously transferred memory, and a process to switch to the host OS after the replacement has been completed.

Furthermore, when cooperation module 170 has switched guest OS 156 and thereafter switches from guest OS 156 to another guest OS 156 rather than host OS 154, cooperation module 170 operates in succession a process to transfer data of a file memory regarding host OS 154 to HDD 150 (the secondary storage device) sequentially in parallel, a process to temporarily freeze the system memory which the previously run guest OS 156 and a program which runs on guest OS 156 utilize, a process to transfer the temporarily frozen system memory sequentially in parallel to the file memory transferred to HDD 150, a process to ensure memory sequentially from the system memory in which the previous guest OS's transfer has been completed until the memory becomes a system memory that the other guest OS requires, and a process to perform switching as a system memory allowing the other guest OS to operate has been ensured.

Each step indicated in FIG. 11 is implemented mainly by processor 102 of control unit 100 of image formation apparatus 1 executing a program of cooperation module 170.

With reference to FIG. 11, processor 102 (cooperation module 170) updates a list having a division into types of memory space and including an ID which can identify a utilized OS for each unit memory (Step S200). Whether switching to a guest OS from a host OS has been requested is determined (step S202).

When switching to the guest OS from the host OS is requested (YES in step S202), processor 102 (cooperation module 170) performs memory transfer on the block basis in parallel until required system memory is available (step S204). Thus, a required memory space can be assigned to the guest OS for which switching is requested. After the memory transfer has been completed, processor 102 (cooperation module 170) performs switching to the guest OS from the host OS (step S206).

Subsequently, processor 102 (cooperation module 170) determines whether switching from the guest OS to another guest OS has been requested (step S208).

When switching from the guest OS to the other guest OS is requested (YES in step S208), i.e., when switching to a guest OS is done and thereafter the guest OS is not switched to the host OS but to another guest OS, then, initially, processor 102 (cooperation module 170) transfers data of a file memory regarding the host OS to HDD 150 (the secondary storage device) sequentially in parallel (Step S210). Subsequently, processor 102 (cooperation module 170) temporarily freezes the system memory which the previously run guest OS and a program which runs on that guest OS utilize (Step S212). Furthermore, processor 102 (cooperation module 170) transfers the temporarily frozen system memory sequentially in parallel to the file memory transferred to HDD 150 (the secondary storage device) (Step S214), and ensures memory sequentially from the system memory in which the previews guest OS's transfer has been completed until the memory becomes a system memory that the other guest OS requires (Step S216). Finally, processor 102 (cooperation module 170) switches the guest OS to the designated, other guest OS as a system memory allowing the other guest OS to operate has been ensured (Step S218). And the control proceeds to step S220.

When switching from the host OS to a guest OS is not requested (NO in step S202), when switching from the guest OS to another guest OS is not requested (NO in step S208), or after step S218 is performed, whether switching from the guest OS to the host OS has been requested is determined (Step S220).

When switching from the guest OS to the host OS is requested (YES in step S220), processor 102 (cooperation module 170) temporarily freezes the system memory which the previously run guest OS and a program which runs on the guest OS utilize (Step S222). And processor 102 (cooperation module 170) replaces the previously transferred memory sequentially (step S224). After the memory has completely been replaced, processor 102 (cooperation module 170) switches the guest OS to the host OS (Step S226). And the control returns to step S200.

When switching from the guest OS to the host OS is not requested (NO in step S220), Step S200 et, seq. are repeated.

<G. Ensuring Image Memory Area>

In the sequence diagram shown in FIG. 4, when switching to a guest OS occurs, and available memory area cannot be ensured due to a previously processed job, a processing on the guest OS may fail. In other words, a design is made such that, of a processing on the guest OS and processing the previously input job, processing the previously input job is prioritized, however, this may be reversed. In other words, when switching to a guest OS occurs, and there is no available image memory due to utilizing a job, the job may be stopped to ensure the image memory.

Furthermore, between a job which previously utilizes an image memory and a job which causes switching to the guest OS, priority may be assessed and which one of the preceding job and switching to the guest OS should be prioritized may be determined.

Thus, cooperation module 170 sets a priority based on a job and job information, depending on the type of the image memory, and controls executing the job based on the set priority.

<H. Determining whether Memory Area can be Obtained>

As has been described above, image formation apparatus 1 according to the present embodiment uses system memory 112 and in addition thereto an image memory to allow a plurality of OSs (host OS 154 and one or more guest OSs 156) to run on a common hardware simultaneously.

Accordingly, preferably, memory area management is done while considering a plurality of memory spaces entirely. Specifically, cooperation module 170 may exchange information with control firmware 160 running on host OS 154, hypervisor 152, and free memory management module 172 (and restore memory management module 174) and update an amount of free memory registered and an amount of restored memory, as appropriate, to determine whether a memory area required to operate various applications (including the authentication application etc.) can be obtained.

Furthermore, cooperation module 170 may hold an update history which records a start/end of some processing whenever the processing starts/ends, and, based on an upward/downward tendency of an amount of memory used or that of free memory, change where a stored content is disposed whenever an occasion to do so arises. For example, when a downward tendency is observed in the amount of free memory (image memory), a restored content may precedingly be paged out (swapped out), i.e., written back to HDD 150.

Each step indicated in FIG. 12 is implemented mainly by processor 102 of control unit 100 of image formation apparatus 1 executing a program of cooperation module 170.

With reference to FIG. 12, processor 102 determines whether a request for a memory area (a page fault) is generated (step S300). If the request for a memory area is not generated (NO in step S300) step S300 is repeated.

If the request for a memory area is generated (YES in step S300) processor 102 inquires of free memory management module 172 about the amount of free memory (step S302). And processor 102 calculates an amount of variation of the amount of free memory from a record of the amount of free memory in the past and an amount of free memory returned as a response to the inquiry (step S304).

Furthermore, processor 102 determines whether the amount of variation of the amount of free memory as calculated shows a downward tendency (step S306). If the amount of variation of the amount of free memory as calculated does not show a downward tendency (NO in step S306), Step S300 et. seq. are repeated.

If the amount of variation of the amount of free memory as calculated shows a downward tendency (YES in step S306), processor 102 inquires restore memory management module 174 about the amount of restored memory (step S308). And processor 102 determines the restored memory that is a target, and pages out the determined restored memory (step S310).

Finally, processor 102 updates an amount of restored memory managed by restore memory management module 174 (step S312), and repeats step S300 et. seq.

Such a total memory area management can reduce a frequency of generation of overcommitment etc. Furthermore, it can improve efficiency of utilization of a limited memory resource.

<I. Appended Note>

The present invention can further be represented as another aspect, as follows:

An image formation apparatus according to another aspect of the present invention includes a control firmware which performs control required for an image formation operation and a host OS, a hypervisor switching and using a plurality of guest OSs, a system memory required for an operation of the host OS including the control firmware and the hypervisor, and an image memory managed by the control firmware and exclusively used for image processing, such that a module which determines whether restoring can be done regarding a free system memory and a system memory that the control firmware and the host OS utilize, a module which determines whether restoring can be done regarding a system memory which the control firmware and the host OS do not utilize, and a module which understands available image memory by cooperating with an image memory management done in the control firmware and the host OS, are mounted in a cooperation module operating on the same level as the hypervisor. Herein it is preferable that a file memory which implements a memory management on a block basis be mounted on the image memory. The image formation apparatus operates in the cooperation module in cooperation a module which associates a job content with a program running on a guest OS in the cooperation module and thus registers them (e.g., a function allowing an association of a program running on the guest OS, such as an authentication program, with a job to be understood, a module which reads one or more guest OSs into a free image memory before starting the job, a module which follows an instruction of the cooperation module determined through the association of the job content with the guest OS before the job's operation to operate a guest OS read by the hypervisor, and a module which exchanges a system memory determined as not being used by the control firmware, and the host OS and another guest OS with a memory which the operated guest OS requires to allow the memory to be used as a system memory of the guest OS.

The module reading one or more guest OSs into the free image memory before starting the job may sort a free image memory of an available-memory list by priority and an ID whenever a job list is added, and determine whether it is available. Furthermore, when the reading module is low in priority for a read guest OS, it may be moved to a higher priority. Furthermore, the reading module may temporarily freeze memory that the control firmware and the host OS utilize that is included in a memory list, as required.

The image formation apparatus may include a module which sets a priority based on a job executed depending on each image memory's type and job information; a module which performs memory transfer assigning a memory space in which a read guest OS runs to a system memory obtained by a module which operates in cooperation by a module managing a list of available free memory allowing an ID capable of identifying each used guest OS to be set and (by a memory transfer function having two or more sets of minimal memory required for transfer) performs memory transfer sequentially in parallel in accordance with a file memory block unit until a system memory which is the above amount of memory is obtained; a module which enables a successive operation of a module which switches to the guest OS after the memory transfer has been completed, a module which temporarily freezes a system memory that the guest OS and an operation program utilize when subsequently switching to the host OS, a module which sequentially replaces the memory previously transferred by the above memory transfer module and thus provides parallel transfer, a module which assigns memory to a stored initial memory address while the sequential transfer is performed, and a module which switches to the host OS after the replacement transfer has been completed; a module which allows the cooperation module to understand that the read guest OS was destroyed by executing a job; and a module which again reads the destroyed guest OS by the above reading means according to the above described procedure before starting a job and implements it.

When switching occurs and there is no available image memory due to using a job the image formation apparatus stops the job and ensures image memory.

The image formation apparatus includes a module which enables a successive operation of a module which, after having switched to a guest OS, switches from the guest OS to another guest OS rather than the host OS, a module which transfers data of a file memory regarding the host OS to a secondary storage device sequentially in parallel, a module which temporarily freezes a system memory which the guest OS and an operation program utilize, a module which transfers the temporarily frozen memory sequentially in parallel to the file memory sequentially transferred to the secondary storage device, a means to ensure memory sequentially from the system memory in which the previous guest OS's transfer has been completed until the memory becomes a system memory that the other guest OS requires, and a means to perform switching as a system memory allowing the other guest OS to operate has been ensured.

The above image formation apparatus gives priority to successive memory spaces in restoring to the image memory regarding both the host OS and the guest OS.

The above image formation apparatus appropriately moves and manages image memory restored when a guest OS is migrated to a system other than the body of the image formation apparatus.

The above image formation apparatus has that the image host OS is not restored. In other words, the body's operation is prioritized.

The above image formation apparatus appropriately migrates a program on a guest OS to another guest OS.

The above image formation apparatus performs appropriate initialization for a guest OS to utilize the image formation apparatus and a device connected to the image formation apparatus.

In the above image formation apparatus, a server type or resident program which manages the image formation apparatus manages a guest OS configuration and a decision is made so that an optimal configuration is provided for a plurality of image formation apparatuses and an image formation apparatus group. For example, a video communications program, an authentication program which requires an intermediate server and the like are mentioned.

The above image formation apparatus may have a module which has a desktop environment on a guest OS for each user and manages job content.

The above image formation apparatus may have an app store module on a guest OS to provide a program.

The above image formation apparatus may have a module which displays information on a guest OS (e.g., a memory, an operation status, a user, a correspondence job, a corresponding file, an image formation apparatus, a server, etc. in operation, etc.) on a console unit.

The image formation apparatus may have a module which accepts a request on a guest OS as a job.

The image formation apparatus may have a module which shares user management information on a guest OS with the image formation apparatus before restoring if necessary. Such a configuration can prevent required information from being lost at the time of restoring.

The image formation apparatus may have a module which visualizes host and guest OSs' operation statuses (e.g., AR (Augmented Reality)).

The image formation apparatus may have a module which utilizes in an external terminal a function which a guest OS provides.

The image formation apparatus may have a hardware cooperation module which operates in cooperation with an image processing ASIC.

The image formation apparatus may have an API module (e.g., an API which allows a memory management function, a priority, a sequence control parameter, etc. to be externally changed) for managing the cooperation module.

The image formation apparatus may have a module which limits a guest OS operation when the image formation apparatus's power is saved.

The cooperation module may include: a means to manage a list having a division into types of memory space and including an ID which can identify a utilized OS for each unit memory; a means to perform memory transfer on a block basis in parallel until a required system memory is available, and assign a guest OS a memory space, and a means to switch to the guest OS after the memory transfer has been completed.

The cooperation module may include a successive-operation performing means to operate in succession a process to temporarily freeze, when switching to the host OS, a system memory which a previously run guest OS and a program which runs on that guest OS utilize, a process to sequentially replace the previously transferred memory, and a process to switch to the host OS after the replacement has been completed.

The cooperation module may include a sensing means to sense that a read guest OS was destroyed by executing a job, and a reading means to read again the sensed, destroyed guest OS before a job is started.

The restoring means may restore content of system memory from a system memory in a main memory to an image memory in the main memory, and when there is no vacancy in the image memory in the main memory, the restoring means may restore it from the system memory to an image memory in a sub memory provided tor image processing.

The cooperation module may set a priority based on a job and job information, depending on the image memory's type, and control executing the job based on the set priority.

The cooperation module may give priority to successive memory spaces in restoring to the image memory regarding the host OS and the guest OS.

The cooperation module may further include a function which moves and manages data content restored when a guest OS is migrated to an external system.

The image formation apparatus may further include a display means to display information on a guest OS.

The cooperation module may further include a means to share user management information on a guest OS with the control firmware before restoring if necessary.

The resource may further include an image processing ASIC. The cooperation module may operate in cooperation with the image processing ASIC.

The image memory adapted for image processing may include at least one of an area different from the system memory in the main memory and an area which the sub memory managed by the image processing ASIC has.

The image memory may be a storage device other than a disc medium.

The image memory may be RAM.

The resource may further include a secondary storage device. The cooperation module may further include a successive-operation means to operate in succession a process to transfer data of a file memory regarding the host OS to a secondary storage device sequentially in parallel when having switched to a guest OS and thereafter switching from the guest OS to another guest OS rather than the host OS, a process to temporarily freeze a system memory which a previously run guest OS and a program which runs on that guest OS utilize, a process to transfer the temporarily frozen system memory sequentially in parallel to the file memory transferred to the secondary storage device, a process to ensure memory sequentially from the system memory in which the previous guest OS's transfer has been completed until the memory becomes a system memory that the other guest OS requires, and a process to perform switching as a system memory allowing the other guest OS to operate has been ensured.

<K. Summary>

The image formation apparatus according to the present embodiment allows a cooperation module to be added in addition to a hypervisor to grasp an image memory as a body job operation is performed in image formation apparatus 1, and can also precedingly read a guest OS into the image memory before starting a job so that a time delay when switching the guest OS can be reduced and thereby a new processing can be implemented on the guest OS without extending an entire body job operation time.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. An image formation apparatus comprising:
a hypervisor for using a resource including a processor and a system memory to control simultaneously running a plurality of OSs (Operating Systems) including a host OS and at least one guest OS;
a control firmware running on the host OS and responsible for controlling the image formation apparatus;
a cooperation module operating on a same level as the hypervisor; and
a free memory management module for managing a free memory space of the system memory that is not used by the host OS or a guest OS running simultaneously with the host OS,
the resource including an image memory managed by the control firmware and adapted for image processing,
the cooperation module being configured to:
cooperate with the control firmware to obtain an available memory space of the image memory;
associate a content of a job to be processed with a program running on one or more guest OSs required for that job;
before starting the job, read a required guest OS into the available memory space of the image memory and cause the associated program to be executed; and
restore a content of the system memory determined as not being used by the host OS and another guest OS to the image memory to allow the system memory to be used as a system memory for a newly run guest OS.

2. The image formation apparatus according to claim 1, wherein the cooperation module is further configured to:
manage a list having a division into types of memory space and including an ID capable of identifying, a utilized OS for each unit memory;
perform memory transfer on a block basis in parallel until a required system memory is available, and assign the guest OS a memory space; and
after the memory transfer has been completed, perform switching to the guest OS.

3. The image formation apparatus according to claim 2, wherein the cooperation module is further configured such that, when switching to the host OS, the cooperation module operates in succession:
a process to temporarily freeze a system memory which a previously run guest OS and a program which runs on that guest OS utilize;
a process to sequentially replace the previously transferred memory, and
a process to switch to the host OS after the replacement has been completed.

4. The image formation apparatus according to claim 1, wherein the cooperation module is further configured to:
sense that the read guest OS has been destroyed by executing a job; and
read again the sensed, destroyed guest OS before starting a job.

5. The image formation apparatus according to claim 1, wherein the cooperation module is further configured to restore the content of the system memory from a system memory in a main memory to an image memory in the main memory, and when there is no vacancy in the image memory in the main memory, restore it from the system memory to an image memory in a sub memory provided for image processing.

6. The image formation apparatus according to claim 1, wherein the cooperation module is configured to set a priority based on a job and job information, depending on the image memory's type, and control executing the job based on the set priority.

7. The image formation apparatus according to claim 1, wherein the cooperation module is configured to give priority to successive memory spaces in restoring to the image memory regarding the host OS and the guest OS.

8. The image formation apparatus according to claim 1, wherein the cooperation module is further configured to move and manage data content restored when a guest OS is migrated to an external system.

9. The image formation apparatus according to claim 1, furthermore comprising a display module to display information on the guest OS.

10. The image formation apparatus according to claim 1, wherein the cooperation module is further configured to share user management information on the guest OS with the control firmware before restoring if necessary.

11. The image formation apparatus according to claim 1, wherein:
the resource further includes an image processing ASIC (Application Specific Integrated Circuit); and
the cooperation module operates in cooperation with the image processing ASIC.

12. The image formation apparatus according to claim 11, wherein the image memory adapted for image processing includes at least one of an area different from a system memory in a main memory and an area which a sub memory managed by the image processing ASIC has.

13. The image formation apparatus according to claim 1, wherein the image memory is a storage device other than a disc medium.

14. The image formation apparatus according to claim 13, wherein the image memory is a RAM (Random Access Memory).

15. The image formation apparatus according to claim 2, wherein:
- the resource further includes a secondary storage device; and
- the cooperation module is configured such that when the cooperation module has switched to the guest OS and thereafter switches from the guest OS to another guest OS rather than the host OS, the cooperation module operates in succession a process to transfer data of a file memory regarding the host OS to the secondary storage device sequentially in parallel, a process to temporarily freeze a system memory which a previously run guest OS and a program which runs on that guest OS utilize, a process to transfer the temporarily frozen system memory sequentially in parallel to the file memory transferred to the secondary storage device, a process to ensure memory sequentially from the system memory in which the previous guest OS's transfer has been completed until the memory becomes a system memory that the other guest OS requires, and a process to perform switching as a system memory allowing the other guest OS to operate has been ensured.

16. A non-transitory computer-readable storage medium having stored thereon a program executable on an image formation apparatus, the program comprising:
- instructions for using a resource including a processor and a system memory to implement a hypervisor to control simultaneously running a plurality of OSs including a host OS and at least one guest OS;
- a control firmware running on the host OS and responsible for controlling the image formation apparatus;
- instructions for implementing a cooperation module operating on a same level as the hypervisor; and
- instructions for implementing a free memory management module that manages a free memory space of the system memory which is not used by the host OS or a guest OS running simultaneously with the host OS,
- the resource including an image memory managed by the control firmware and adapted for image processing,
- the cooperation module comprising:
  - a functionality to cooperate with the control firmware to obtain an available memory space of the image memory;
  - a functionality to associate a content of a job to be processed with a program running on one or more guest OSs required for that job;
  - a functionality to, before starting the job, read a required guest OS into the available memory space of the image memory and cause the associated program to be executed; and
  - a functionality to restore a content of the system memory determined as not being used by the host OS and another guest OS to the image memory to allow the system memory to be used as a system memory for a newly run guest OS.

* * * * *